(12) United States Patent
Kitabayashi

(10) Patent No.: US 7,048,390 B2
(45) Date of Patent: May 23, 2006

(54) PRODUCING METHOD OF OPTICAL DEVICE, POSITIONING MASTER, OPTICAL DEVICE AND PROJECTOR

(75) Inventor: Masashi Kitabayashi, Horigane-mura (JP)

(73) Assignee: Seiko Epson Corporation, Tokyo (JP)

( * ) Notice: Subject to any disclaimer, the term of this patent is extended or adjusted under 35 U.S.C. 154(b) by 384 days.

(21) Appl. No.: 10/270,121

(22) Filed: Oct. 15, 2002

(65) Prior Publication Data

US 2003/0072012 A1   Apr. 17, 2003

(30) Foreign Application Priority Data

Oct. 16, 2001   (JP)   ............... 2001-318679

(51) Int. Cl.
  *G03B 21/00*   (2006.01)
  *G03B 21/14*   (2006.01)
  *H04N 3/26*   (2006.01)

(52) U.S. Cl. .................. 353/119; 353/121; 348/745

(58) Field of Classification Search ............... 353/119, 353/122, 101; 356/614; 348/745, 806, 807
See application file for complete search history.

(56) References Cited

U.S. PATENT DOCUMENTS 5,975,705 A * 11/1999 Lee ............... 353/31
6,031,587 A * 2/2000 Okuyama et al. ............... 349/8
6,320,709 B1 * 11/2001 Kitabayashi et al. ......... 359/831
6,416,187 B1 * 7/2002 Menard ...................... 353/122
RE38,306 E * 11/2003 Fujimori et al. ............ 353/119

FOREIGN PATENT DOCUMENTS

JP   2001-235795   8/2001

* cited by examiner

*Primary Examiner*—Christopher Mahoney
(74) *Attorney, Agent, or Firm*—Oliff & Berridge, PLC

(57) ABSTRACT

An attitude of a measurement reference surface of a positioning master is adjusted using an auto-collimator, the positioning master being disposed so that the adjusted measurement reference surface is located on a designed position, and the light beam irradiated from the measurement reference surface is detected by a CCD camera to set the reference position. A calibrated position relative to the designed position is set based on average optical characteristics obtained by a projection lens inspection apparatus as an initializing process and the CCD camera is moved to the calibrated position. An optical device is mounted and a position of a liquid crystal panel is adjusted while detecting the light beam irradiated from the light-irradiating surface of a cross dichroic prism of the optical device by the CCD camera and the liquid crystal panel is fixed with ultraviolet curing adhesive.

10 Claims, 26 Drawing Sheets

FIG.10
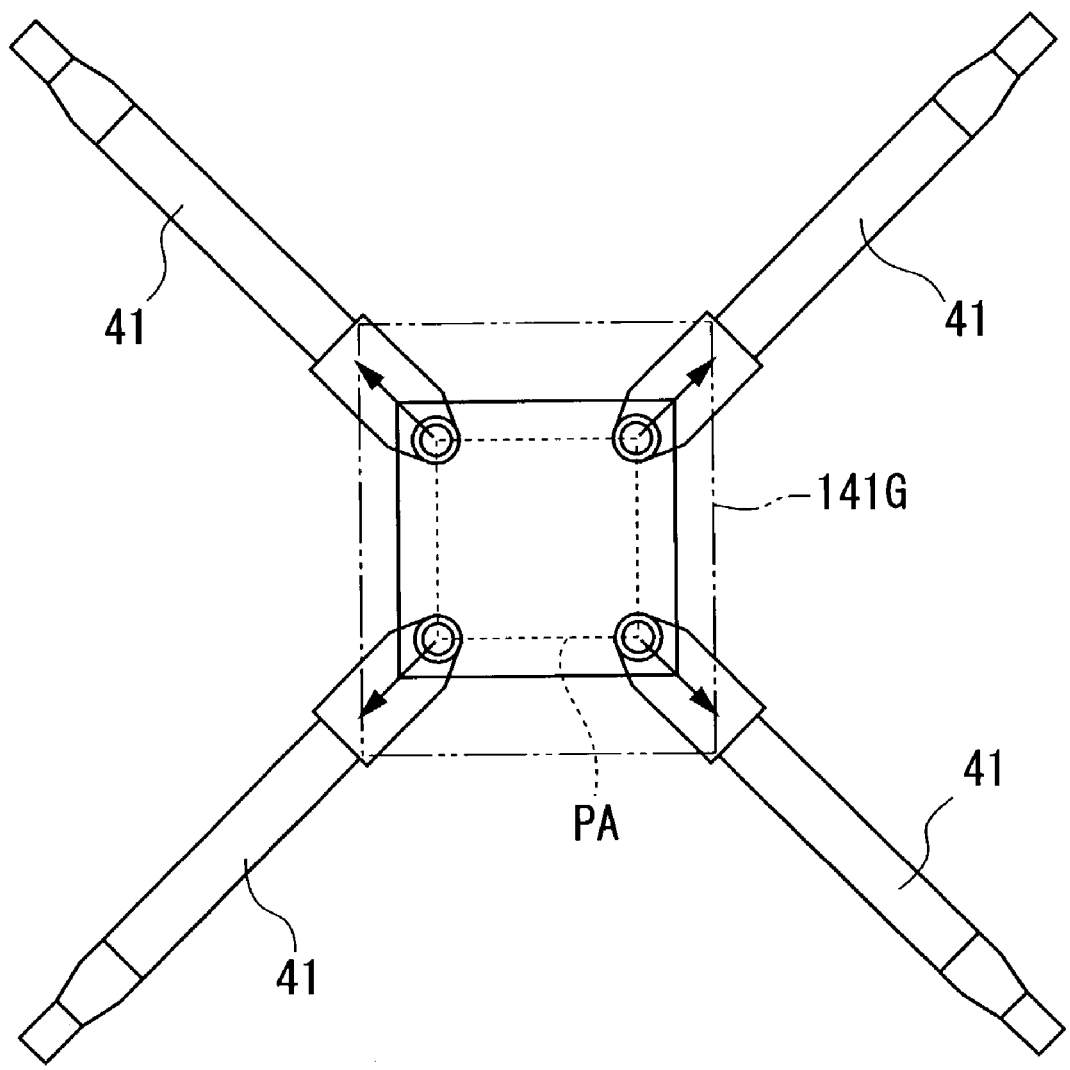
X–X
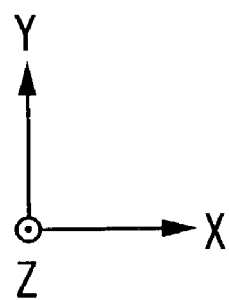

PRODUCING METHOD OF OPTICAL DEVICE, POSITIONING MASTER, OPTICAL DEVICE AND PROJECTOR

BACKGROUND OF THE INVENTION

1. Field of the Invention

The present invention relates to a producing method of optical device, a positioning master, an optical device and a projector.

2. Description of Related Art

Conventionally, a projector including a plurality of optical modulators (liquid crystal panels) for modulating a plurality of colors lights in accordance with image information, a color-combining optical system (cross dichroic prism) for combining the color lights modulated by the respective optical modulators, and a projection optical system (projection lens) for enlarging and projecting the light combined by the prism to form a projection image has been used. So-called three-plate projector is known as such projector, where a light beam irradiated by a light source is separated into three color lights of red, green and blue by a dichroic mirror, which is modulated by three liquid crystal panels for each color light in accordance with image information, the modulated light beam is combined by a cross dichroic prism and the color image is enlarged and projected by a projection lens.

In order to obtain vivid projection image by such projector, focus and alignment adjustment of the respective liquid crystal panels has to be conducted with high accuracy in producing the projector for avoiding shift in picture element between the respective liquid crystal panels and distance shift from the projection lens. The above focus adjustment refers to an adjustment for accurately locating the respective liquid crystal panels at the back focus position of the projection lens and alignment adjustment refers to aligning the picture elements of the respective liquid crystal panels, which also apply in the following description.

The focus and alignment adjustment of the liquid crystal panel is conducted on an optical device having three liquid crystal panels and a cross dichroic prism, by (1) entering a light beam from an adjustment light source to be incident on image formation area of the respective liquid crystal panels (2) detecting the light beam incident on the light-incident surface of the cross dichroic prism and irradiated from the light-irradiating surface thereof by a light beam sensor; and (3) adjusting the relative position of the respective liquid crystal panels by a position adjustor while checking the focus and picture element position of the respective liquid crystal panels detected by the light beam sensor. Thus positioned respective liquid crystal panels are adhered and fixed using ultraviolet curing adhesive, thus producing a highly accurate optical device.

In order to produce an optical device according to the above steps, since the reference position (start position before adjustment) of the light beam sensor has to be obtained before conducting focus and alignment adjustment, a master optical device of which focus and alignment are highly accurately adjusted by other producing machine is prepared in advance and the reference position of the light beam sensor is set with reference to the position of the optical modulator of the master optical device.

Since the master optical device is for setting the reference position of the light beam sensor, the master optical device has to be highly accurately arranged considering optical characteristics of the projection lens. Accordingly, in a conventional arrangement, a machine dedicated for producing a master optical device having an optical device to be adjusted and a projection lens of average characteristics is prepared, while the master optical device is produced by highly accurately adjusting focus and alignment by introducing light beam into the optical device to be adjusted and sensing a projection image projected onto screen etc. through the projection lens with a CCD camera etc.

However, since a machine dedicated for producing the master optical device has to be prepared only for preparing a master optical device, production efficiency of optical device is deteriorated and the production cost of the optical device is increased.

SUMMARY OF THE INVENTION

An object of the present invention is to provide a producing method of an optical device capable of reducing production cost, a positioning master, an optical device and a projector.

A producing method of an optical device is for an optical device including a plurality of optical modulators that modulates a plurality of color lights in accordance with image information for each color light, and a color combining optical system having a plurality of light-incident surfaces for the optical modulators to be attached and a light-irradiating surface that combines and irradiates the color light incident on the light-incident surface, the method comprising the steps of: setting a reference position of a light beam sensor for detecting a light beam irradiated from the light-irradiating surface of the color combining optical system based on a designed position of any one of the optical modulators relative to the color combining optical system; obtaining optical characteristics of a projection optical system combined with the optical device to set a calibrated position relative to the designed position; moving the light beam sensor to the calibrated position; mounting an optical device to be adjusted; adjusting the position of the optical modulator while detecting the light beam irradiated from the light-irradiating surface of the color combining optical system; and fixing the position of the optical modulator of which position is adjusted.

The light beam sensor may be a CCD camera etc. having a pickup element such as CCD, an image importing device for importing the signal detected by the pickup element, and a processor for processing the imported image. The CCD camera may be disposed in plural, which may be respectively located on four corners of the projected image to take the image at the corners. At this time, in order to avoid interference, the CCD cameras may preferably be located on diagonal lines of the projected image.

According to the present invention, the optical device may be produced according to the following steps.

(1) A reference position of the light beam sensor is set based on the designed position of the optical modulator relative to the color combining optical system.

Incidentally, the designed position refers to a designed back focus position of a projection optical system combined with the optical device. However, the reference position may be set at a position a predetermined distance away from the back focus position of the projection optical system.

(2) As a preliminary step, average optical characteristics such as axial chromatic aberration, resolution and inclination of the projected image surface of the projection optical system combined with the optical device are collected. For instance, a light beam passing through a predetermined test pattern is introduced to a target projection optical system with the use of a projection optical system checker, and the predetermined test pattern image is projected onto a screen. Subsequently, the test pattern image is detected by a CCD camera etc. to obtain the optical characteristics. Such process is conducted for ten to twenty projection optical systems, and the obtained optical characteristics are averaged to obtain the average optical characteristics.

(3) The calibrated position relative to the designed position is set after obtaining the average optical characteristics and the light beam sensor is moved to the calibrated position and fixed there.

(4) The target optical device is mounted and the position of the optical modulator is adjusted while detecting the light beam irradiated from the light-irradiating surface of the color combining optical system of the mounted optical device with the light beam sensor at the calibrated position.

(5) Thus positioned optical modulator is adhered and fixed to the color combining optical system using, for instance, ultraviolet curing adhesive to produce a highly accurate optical device.

Since the optical device is produced with the above processes, it is not necessary to prepare other machines or prepare a master optical device produced by the machine, so that the production cost of the optical device can be reduced.

In the above, the reference position may preferably be set by disposing a positioning master having a measurement reference surface at the designed position and by detecting the light beam irradiated from the measurement reference surface with the light beam sensor, and, prior to setting the reference position, the light beam may preferably be introduced on the measurement reference surface to detect a light reflected by the measurement reference surface, thereby adjusting the attitude of the measurement reference surface.

According to such arrangement, in adjusting the reference surface attitude, an auto-collimator, for instance, is used to introduce a light beam onto the measurement reference surface of the positioning master and detect the light reflected by the measurement reference surface. The attitude of the measurement reference surface is adjusted so that the position of the light beam and the position of the reflected light coincide with each other and the measurement reference surface is set to be perpendicular to the light beam. Thereafter, in setting the reference position setting process, the positioning master is disposed so that the attitude-adjusted measurement reference surface comes to the designed position, and the light beam irradiated by the measurement reference surface is detected by the light beam sensor to set the reference position.

According to the above process, the attitude of the measurement reference surface of the master can be accurately and easily adjusted, so that the measurement reference surface can be used as a reference for obtaining the reference position of the light beam sensor.

The adjustment of the reference surface attitude may preferably be conducted by an auto-collimator.

Accordingly, the reference surface attitude can be easily adjusted while the auto-collimator is accurately positioned and fixed by introducing the light beam from an existing auto-collimator to the measurement reference surface of the master and by adjusting the attitude of the measurement reference surface of the master while detecting the reflected light.

A positioning master according to of the present invention sets a reference position of a light beam sensor, the light beam sensor used for producing an optical device having a plurality of optical modulators that modulates a plurality of color lights in accordance with image information for each color light, and a color combining optical system having a plurality of light-incident surfaces for the optical modulators to be attached and a light-irradiating surface that combines and irradiates the color light incident on the light-incident surface, the master comprising: a measurement reference surface that transmits and irradiates the light beam introduced from a backside; and an attitude adjustor that adjusts the attitude of the measurement reference surface relative to the irradiating direction of the light beam.

According to the above aspect of the present invention, the position of the measurement reference surface relative to the light beam sensor can be accurately adjusted by operating the attitude adjuster to adjust the attitude of the measurement reference surface. At this time, by forming a predetermined test pattern on the measurement reference surface, the light beam sensor can accurately detect the image light including the test pattern introduced from the backside. Incidentally, in adjusting the attitude, for instance, an auto-collimator is used to introduce a light beam on the measurement reference surface and the position of the introduced light beam and the reflected light are coincided by the attitude adjuster while detecting the light reflected on the measurement reference surface, thereby accurately adjusting the attitude of the measurement reference surface.

An optical device according to still another aspect of the present invention is characterized in being produced according to the producing method of the optical device of the above aspect of the present invention.

According to the above aspect, the same effect and function as the producing method of the above-described optical device can be obtained, thereby inexpensively producing highly accurate optical device.

A projector according to further aspect of the present invention is characterized in having the above optical device.

According to the above aspect of the present invention, the same effect and function as the producing method of the above-described optical device can be obtained, and a projector capable of projecting vivid projection image can be produced while reducing cost.

BRIEF DESCRIPTION OF THE DRAWINGS

FIG. 10 is a front elevational view showing the beam light sensor, which is taken along X-X line in FIG. 9;

DETAILED DESCRIPTION OF PREFERRED EMBODIMENT(S)

An embodiment of the present invention will be described below with reference to attached drawings.

[1. Structure of Projector]

Figure 1:
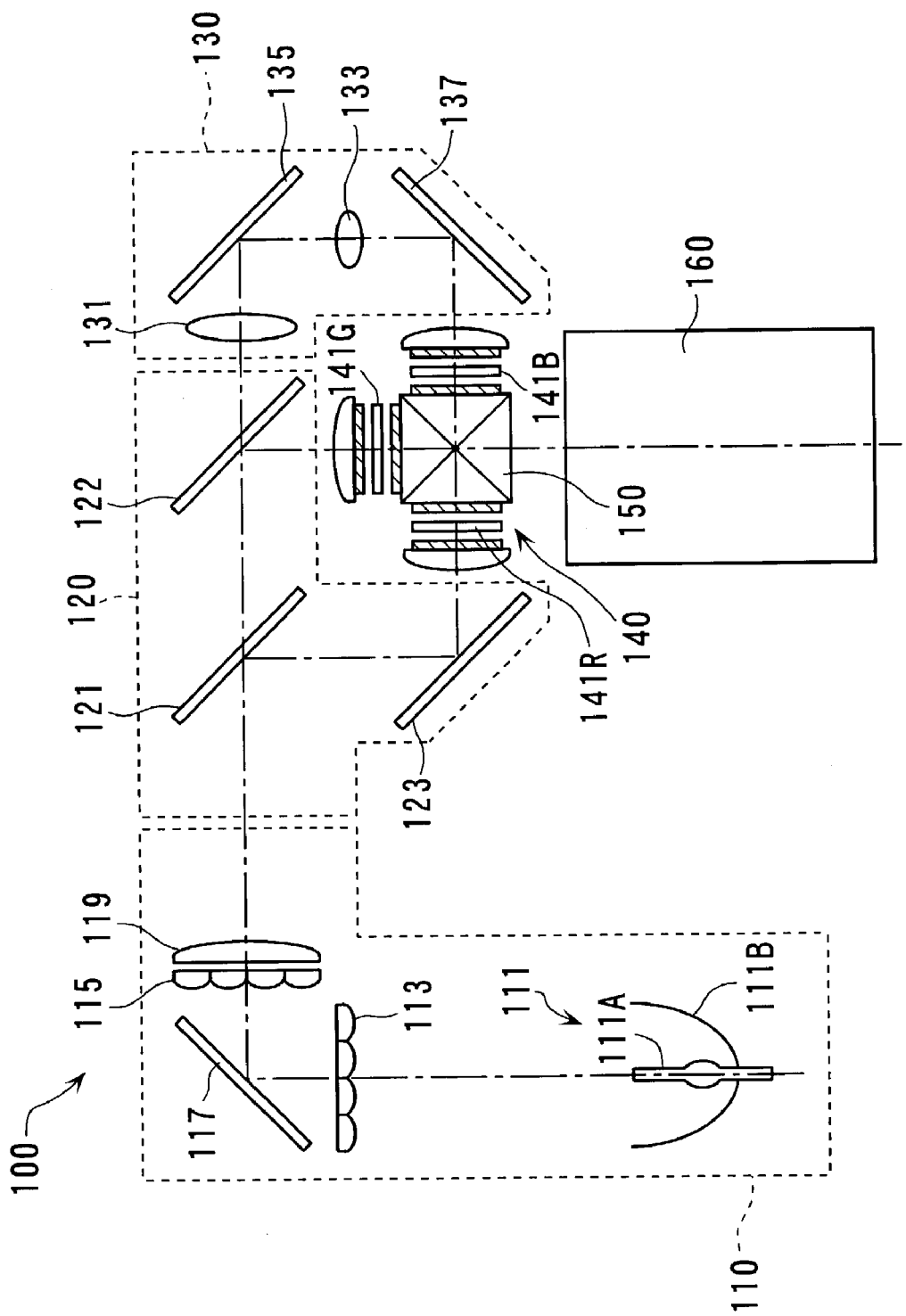
FIG. 1 is a schematic illustration showing a structure of a projector including an optical device produced by a producing machine of an optical device according to an embodiment of the present invention.

FIG. 1 is an illustration showing a structure of a projector 100 having an optical device including a plurality of optical modulators to be adjusted and a color-combining optical system.

The projector 100 includes an integrator illuminating optical system 110, a color-separating optical system 120, a relay optical system 130, an electric optical device 140, a cross dichroic prism 150 as a color-combining optical system and a projection lens 160 as a projection optical system.

The integrator illumination optical system 110 has a light source 111 including light source lamp 111A and a reflector 111B, first lens array 113, second lens array 115, a reflection mirror 117 and a superposition lens 119. Irradiating direction of the light beam irradiated by the light source lamp 111A is aligned by the reflector 111B and is separated into a plurality of sub-beams by the first lens array 113, which is focused around the second lens array 115 after the irradiating direction is bent at a right angle by a the reflection mirror 117. The respective sub-beams irradiated by the second lens array 115 are incident on the downstream incident surface of the superimposing lens 119 so that the central axis (main beam) thereof is perpendicular on the incident surface. The plurality of sub-beams irradiated by the superimposing lens 119 are superimposed on the three liquid crystal panels 141R, 141G and 141B constituting the electric optical device 140.

The color separating optical system 120 has two dichroic mirrors 121 and 122 and a reflection mirror 123, where the mirrors 121, 122 and 123 separate the plurality of sub-beams irradiated from the integrator illuminating optical system 110 into three color lights of red, green and blue.

The relay optical system 130 includes an incident-side lens 131, a relay lens 133 and a reflection mirrors 135 and 137, which introduces the color light, blues light for instance, separated by the color separating optical system 120 to the liquid crystal panel 141B.

The electric optical device 140 has the liquid crystal panels 141R, 141G and 141B which, for instance, use a polysilicon TFT as switching element. The respective color lights separated by the color-separating optical systems 120 is modulated by the three crystal panels 141R, 141G and 141B in accordance with image information to form an optical image.

The cross dichroic prism 150 combines the images modulated for respective color lights irradiated from the three liquid crystal panels 141R, 141G and 141B to form a color image. Incidentally, a dielectric multi-layered film for reflecting red light and a dielectric multi-layered film for reflecting blue light are formed along boundaries of four orthogonal prisms in approximately X-shape, the dielectric multi-layered films combining three color lights. The color image combined by the cross dichroic prism 150 is irradiated from the projection lens 160 and is enlarged and projected on the screen.

[2. Structure of Optical Device]

Figure 2:
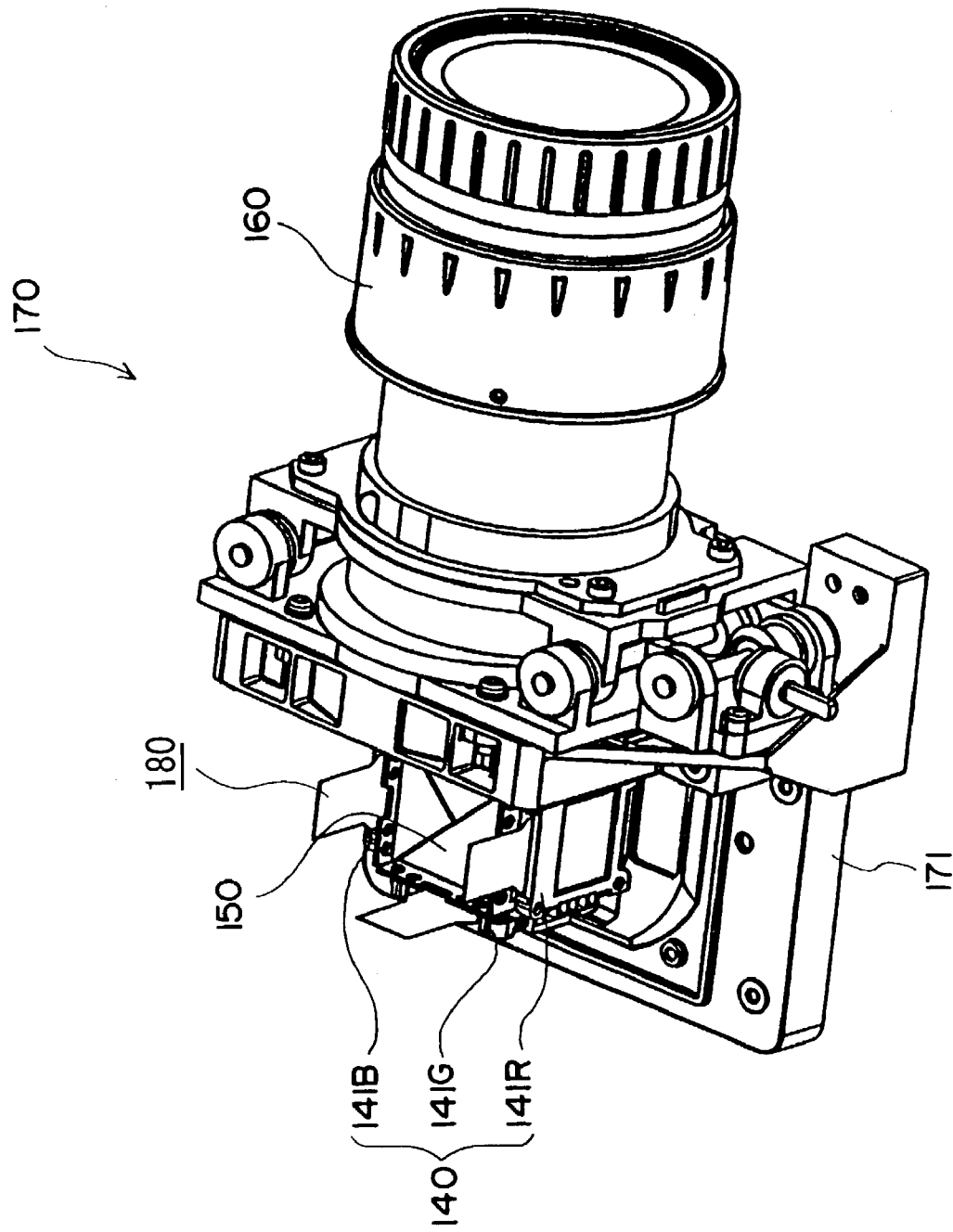
FIG. 2 is an exterior perspective view showing a structure of a primary section of the projector.

In the projector 100, as shown in FIG. 2, an optical device 180 having the electric optical device 140 and the cross dichroic prism 150 and the projection lens 160 combined with the optical device 180 are integrated as an optical unit 170. The optical unit 170 has a head 171 as a L-shaped side structure made of magnesium alloy etc. The projection lens 160 is fixed on the perpendicular out-plane side of the L-shape of the head 171. The cross dichroic prism 150 is screwed on the upper side of the horizontal surface of the L-shape of the head 171.

Figure 3:
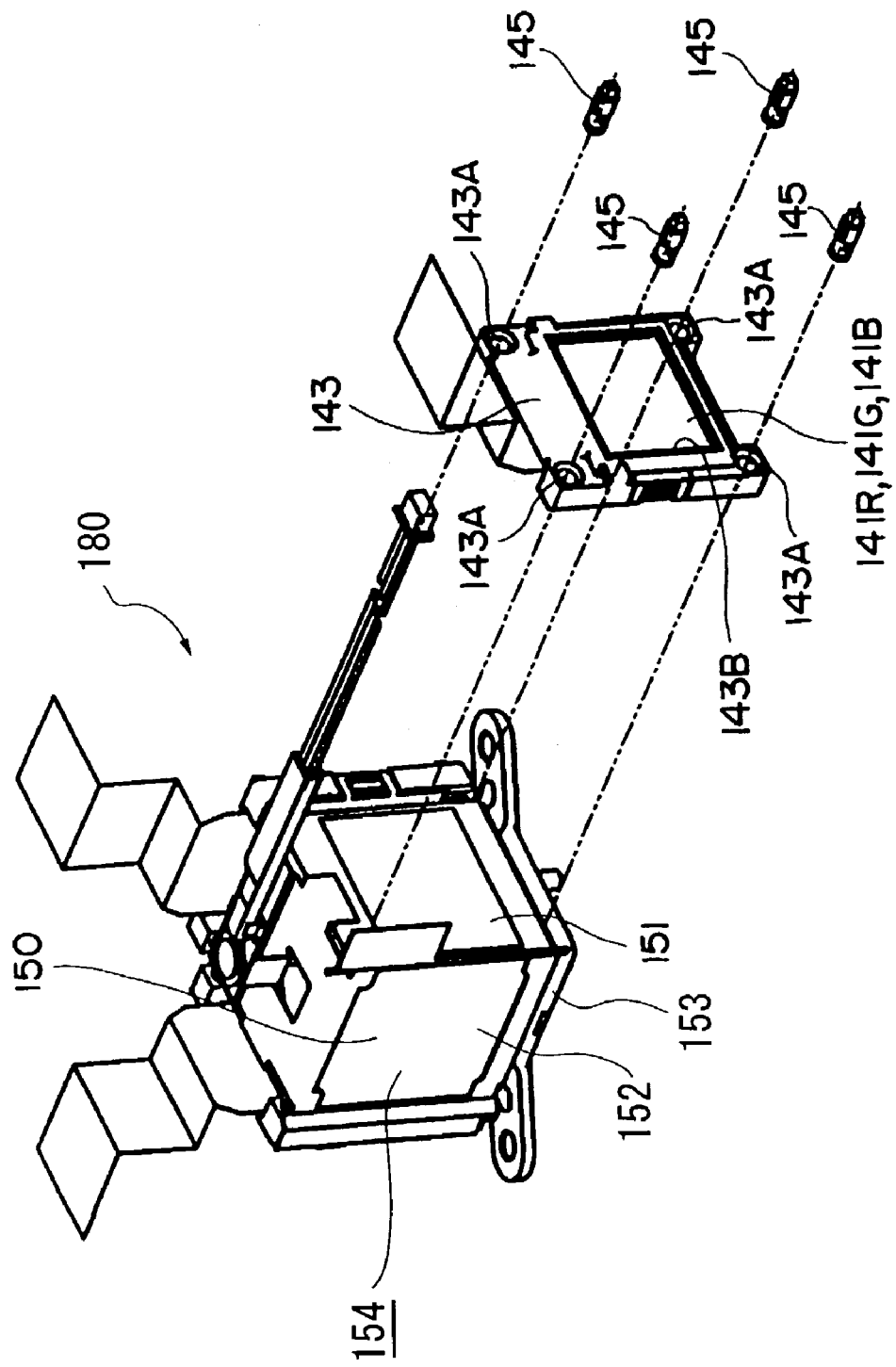
FIG. 3 is an exploded perspective view showing the optical device.

The three liquid crystal panels 141R, 141G and 141B constituting the electric optical device 140 surround the three sides of the cross dichroic prism 150. Specifically, as shown in FIG. 3, the respective liquid crystal panels 141R, 141G and 141B are accommodated in a holding frame 143 and are fixed on the cross dichroic prism 150 by a POP (Panel On Prism) structure where the liquid crystal panels are adhered and fixed on a light-incident surface 151 of the cross dichroic prism 150 by inserting a transparent resin pin 145 to a hole 143A formed on four corners of the holding frame 143 together with an ultraviolet curing adhesive. A rectangular opening 143B is formed on the holding frame 143 through which the respective liquid crystal panels 141R, 141G and 141B are exposed to form an image formation area. In other words, the respective color lights R, G and B are introduced to the exposed part of the respective liquid crystal panels 141R, 141G and 141B to form an optical image in accordance with image information.

A fixing plate 153 is adhered and fixed on the lower side of the cross dichroic prism 150, the fixing plate 153 and the cross dichroic prism 150 constituting a prism unit 154.

In the optical device 180 using POP structure, focus adjustment, alignment adjustment and fixing process of the respective liquid crystal panels 141R, 141G and 141B have to be approximately simultaneously conducted in adhering and fixing the liquid crystal panels 141R, 141G and 141B to the cross dichroic prism 150. Specific production process including the adjustment step will be described later.

[3. Structure of Projection Lens Inspection Apparatus]

Figure 4:
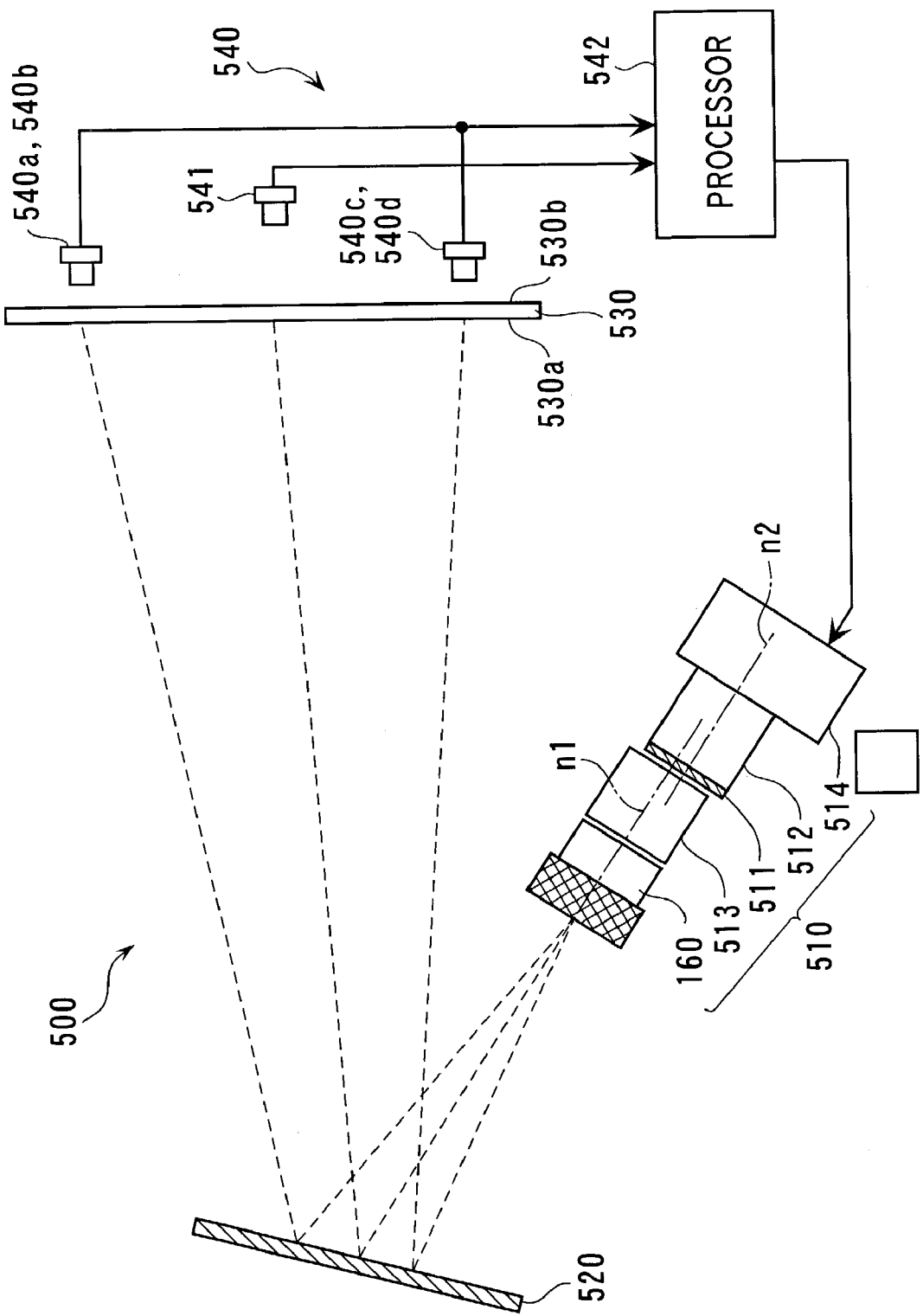
FIG. 4 is a schematic illustration showing a projection lens tester.

FIG. 4 is an illustration showing a projection lens inspection apparatus 500.

The projection lens inspection apparatus 500 is a device for measuring optical characteristics of projection lens 160 combined with the optical device 180, which has a projecting portion 510, a mirror 520, a screen 530 and a tester 540. In the inspection apparatus 500, the projection lens 160 to be measured can be attached and detached, so that the projection lens can be easily exchanged with the other projection lens to be measured.

The projecting portion 510 is a simulator for irradiating a light beam on the projection lens 160, the light beam approximately the same as actual light beam irradiated on the projection lens 160 of the projector 100, which includes a light source (not shown), a test sheet 511 simulating the liquid crystal panels 141R, 141G and 141B and including a predetermined test pattern, a holder 512 for holding the test sheet 511, a dummy prism 513 for simulating the cross dichroic prism 150, and a six-axis adjuster 514 for adjusting three-dimensional position of the projection lens 160 by adjusting the three-dimensional position of the holder 512. The above predetermined test pattern includes various patterns for adjusting contrast and resolution, measuring chromatic aberration etc.

Incidentally, in order to reproduce shift projection, central axis n1 of the dummy prism 513 and the projection lens 160 and central axis n2 of the holder 512 with the test sheet 511 being mounted and the six-axis adjuster 514 are mutually shifted in parallel by a predetermined distance.

The screen 530 is a transmission screen where image light can be observed from a backside 530b opposite to a projection side 530a for the image light to be projected.

The tester 540 measures optical characteristics of the image projected on the screen 530, which includes four adjustment pickup portions 540a to 540d, a single measurement pickup portion 541 and a processor 542. The processor 542 is electrically connected with the adjustment pickup portions 540a to 540d and the measurement pickup portion 541 and is also electrically connected with the six-axis adjuster 514.

The four adjustment pickup portions 540a to 540d are located at a position corresponding to four corners of the image projected on the screen 530 to adjust the formation area and trapezoid distortion etc. of the projected image. The measurement pickup portion 541 detects the image light including the predetermined test pattern.

In the above projection lens inspection apparatus 500, the image light including the predetermined test pattern irradiated from the projecting portion 510 is reflected by the mirror 520 and subsequently is projected on the screen 530. The projected test pattern image is imaged on the four adjustment pickup portions 540a to 540d and the three-dimensional position of the projecting portion 510 is adjusted by the processor 542 to adjust the projected image. Subsequently, the test pattern image is imaged on the measurement pickup portion 541 and optical characteristics of the projection lens 160 such as the resolution, inclination of image surface, and distortion of peripheral image are obtained by the processor 542. The optical characteristics of ten to twenty projection lenses 160 are collected and average optical characteristics of the projection lens 160 is obtained by averaging the data.

[4. Structure of Producing Machine of Optical Device]

Next, producing machine 2 of optical device will be described with reference to FIGS. 5 to 12.

Figure 5:
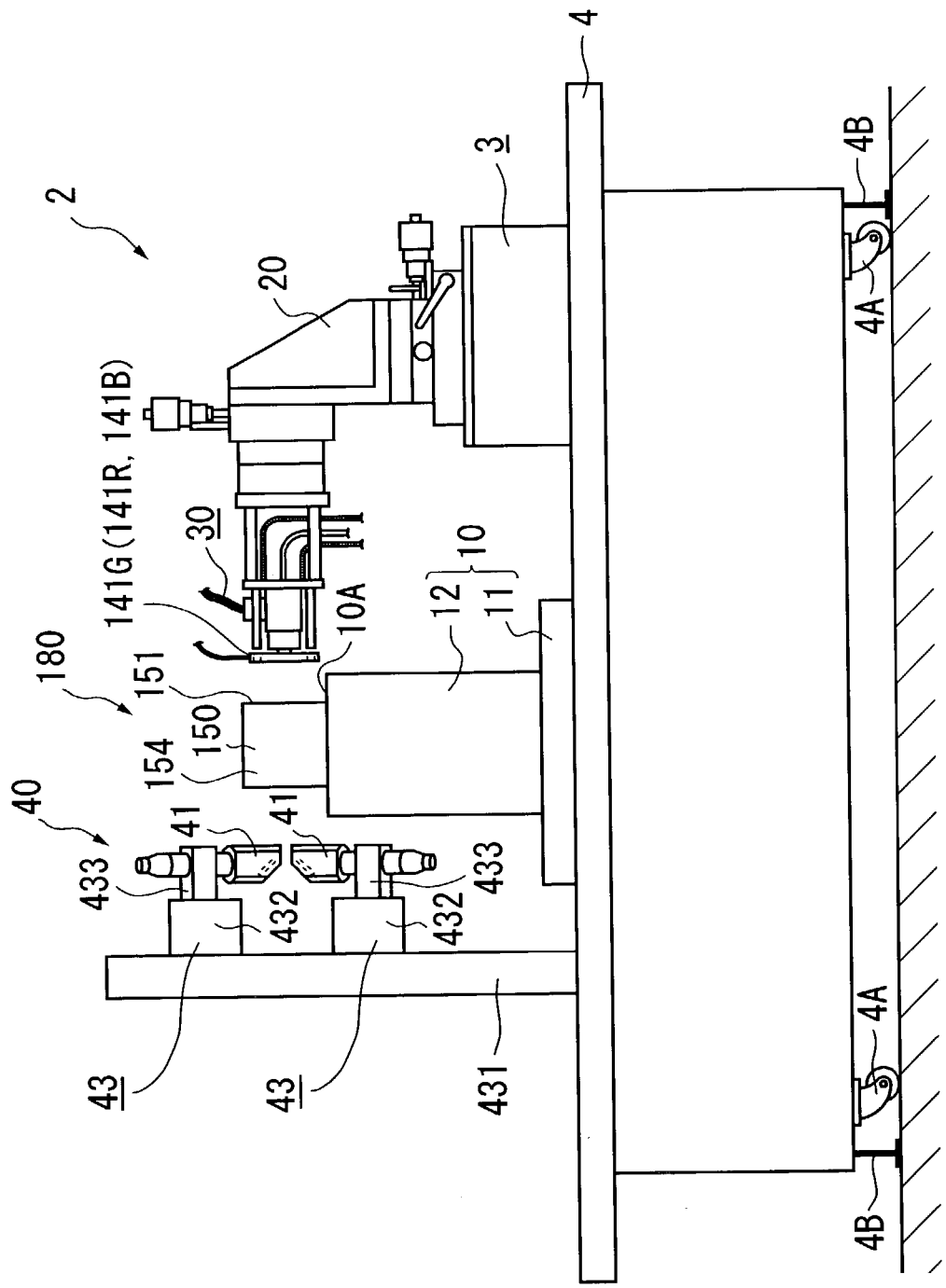
FIG. 5 is a side elevational view showing a producing machine for producing the optical device.
Figure 6:
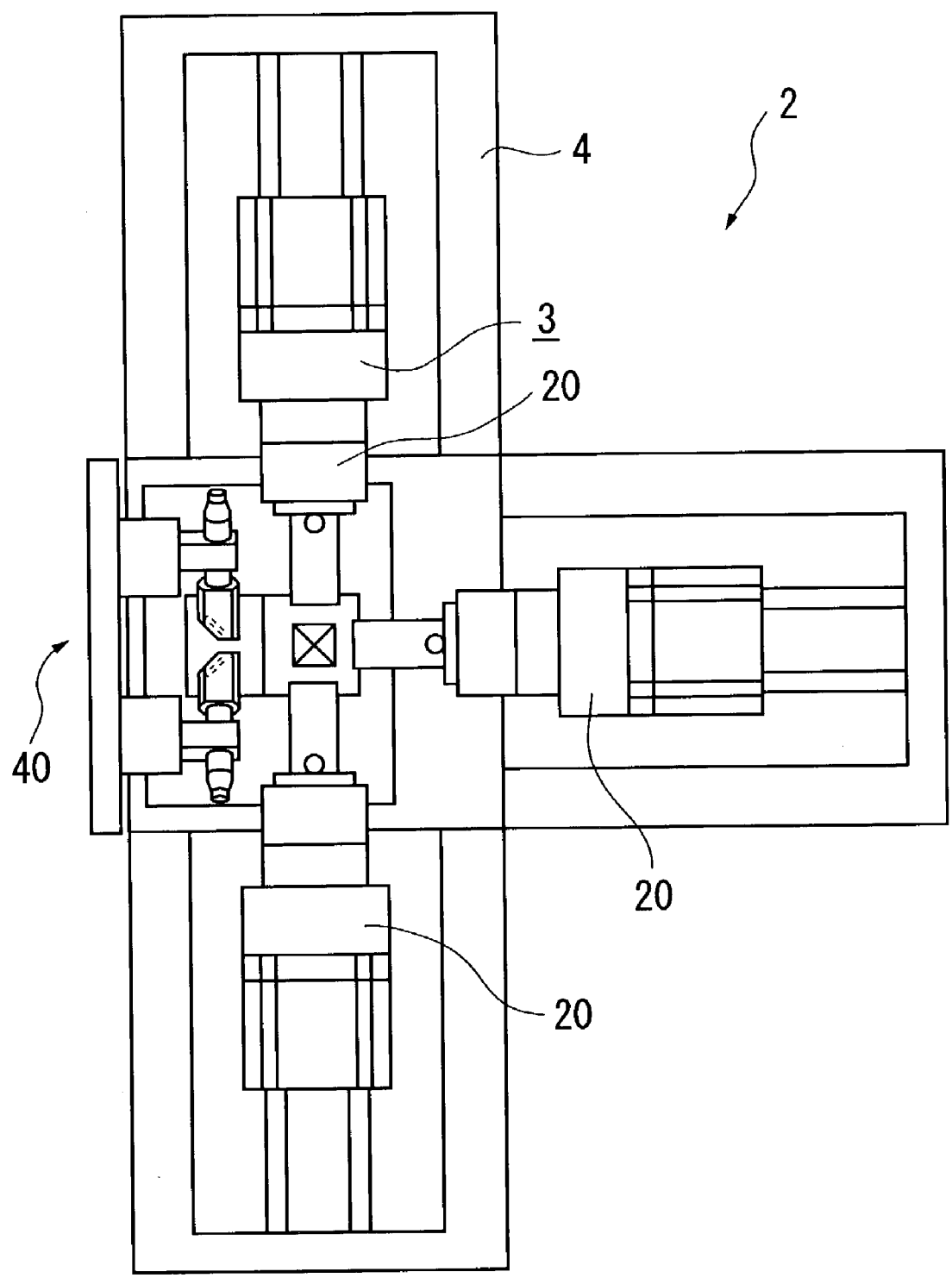
FIG. 6 is a schematic illustration showing the optical device producing machine seen from above.

FIG. 5 is a side elevation showing the optical device producing machine 2. FIG. 6 is a schematic illustration of the optical device producing machine 2 seen from above.

As shown in FIGS. 5 and 6, the producing machine 2 of optical device according to the present invention produces the optical device 180 by adjusting the relative position of the respective liquid crystal panels 141R, 141G and 141B and fixing the respective liquid crystal panels 141R, 141G and 141B to the cross dichroic prism 150, which includes a machine body 3 and a table 4 for the machine body 3 to be mounted.

As shown in FIG. 5, a castor 4A for facilitating movement of the machine body 3 to a different place and a stopper 4B for fixing the machine body 3 to prevent from movement are provided on the lower side of the table 4.

The machine body 3 has a pedestal 10, a six-axis position adjusting unit 20 as a position adjuster, a light source unit 30, a light beam sensor 40 as shown in FIG. 5, and, though not shown in FIG. 5, a computer for controlling the operation of the devices 10, 20, 30 and 40 and for processing the image signal detected by the light beam sensor 40.

The pedestal 10 is a base for mounting the cross dichroic prism 150 on a predetermined position on an upper side 10A thereof as shown in FIG. 5, which includes a basement 11 provided on the table 4 and a mount body 12 vertically set on the basement 11 for the cross dichroic prism 150 to be attached.

Figure 7:
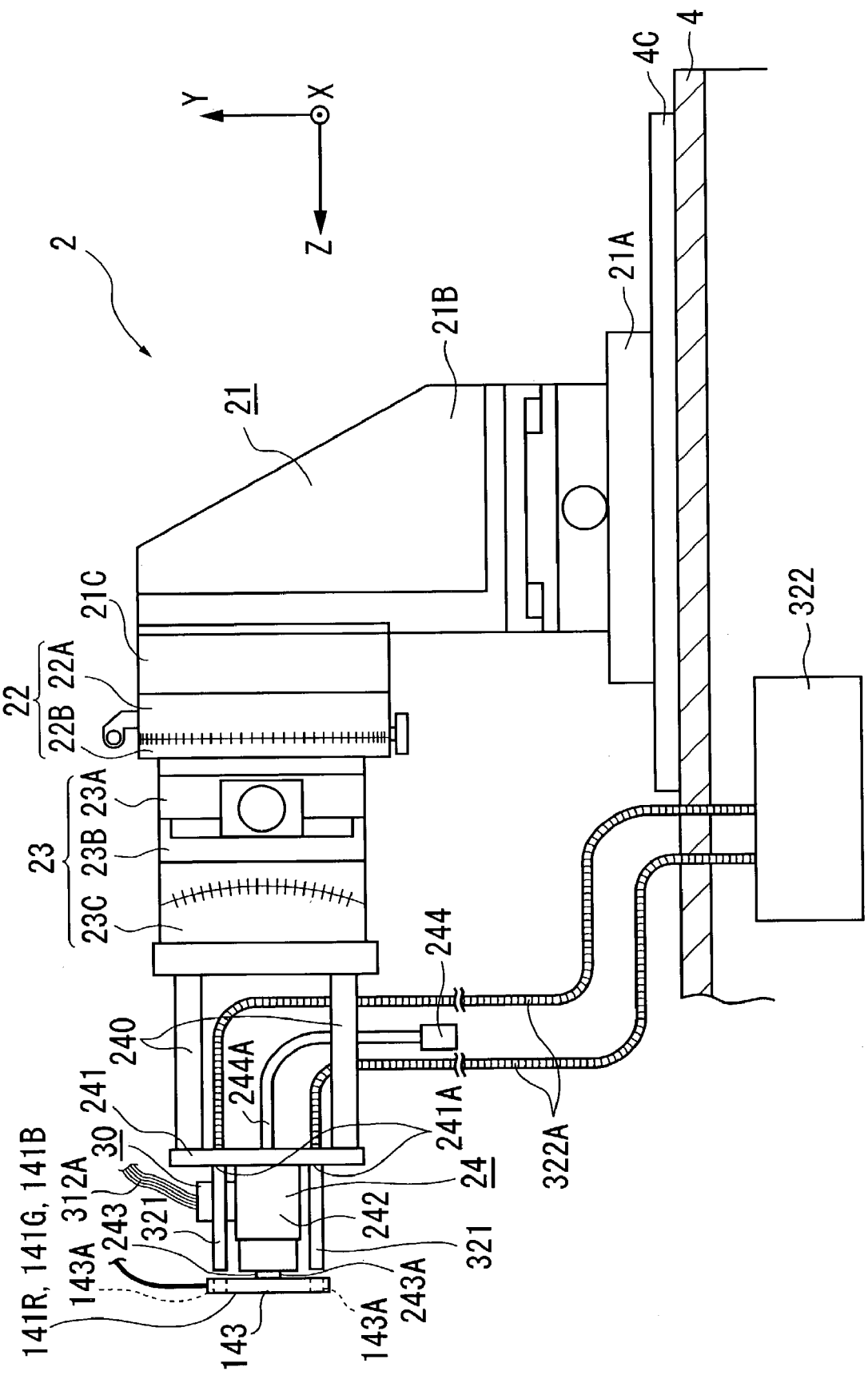
FIG. 7 is a side elevation showing a primary section of the optical device producing machine.

The six-axis position adjusting unit 20 adjusts the disposition and relative position of the liquid crystal panels 141R, 141G and 141B relative to the light-incident surface 151 of the cross dichroic prism 150. FIG. 7 is an illustration showing a primary section of the optical device producing machine 2.

As shown in FIG. 7, the six-axis position adjusting unit 20 has a plane position adjuster 21 movable along a rail 4C on the upper side of the table 4, an in-plane rotary position adjuster 22 provided on a distal end of the plane position adjuster 21, an out-plane rotary position adjuster 23 provided on a distal end of the in-plane rotary position adjuster 22, and a liquid crystal panel holder 24 provided on a distal end of the out-plane rotary position adjuster 23.

The plane position adjuster 21 adjusts advancement and retraction position and plane position relative to the light-incident surface 151 (FIG. 3) of the cross dichroic prism 150, which includes a base 21A slidable on the table 4, a leg 21B vertically provided on the base 21A and a connector 21C provided on the upper distal end of the leg 21B for the in-plane rotary position adjuster 22 to be connected.

The base 21A is movable in the Z-axis direction of the table 4 by a drive mechanism such as a motor (not shown). The leg 21B is movable in X-axis direction relative to the base 21A by a drive mechanism such as a motor (not shown). The connector 21C is movable in Y-axis direction relative to the leg 21B by a drive mechanism such as a motor (not shown).

The in-plane rotary position adjuster 22 adjusts the rotary position in in-plane direction of the liquid crystal panels 141R, 141G, 141b relative to the light-incident surface 151 of the cross dichroic prism 150, which includes a cylindrical base 22A fixed on the distal end of the plane position adjuster 21 and a rotation adjuster 22B rotatable in circumferential direction of the base 22A.

By adjusting the rotary position of the rotation adjuster 22B, the rotary position in in-plane direction of the liquid crystal panels 141R, 141G and 141B relative to the light-incident surface 151 of the cross dichroic prism 150 can be adjusted with high accuracy.

The out-plane rotary position adjuster 23 adjusts rotary position in out-plane direction of the liquid crystal panels 141R, 141G and 141B relative to the light-incident surface 151 of the cross dichroic prism 150. The out-plane rotary position adjuster 23 has a base 23A fixed at the distal end of the in-plane rotary position adjuster 22 and formed with a concave curve arched in horizontal direction at the distal end thereof, a first adjuster 23B slidable along the arch on the concave curve of the base 23A, the first adjuster 23B being formed with a concave curve arched in perpendicular direction at the distal end thereof, and a second adjuster 23C slidable along the concave curve of the first adjuster 23B.

When the motor (not shown) provided on the side of the base 23A is rotated, the first adjuster 23B is slid and, when the motor (not shown) provided on the upper side of the first adjuster 23B is rotated, the second adjuster 23C is slid, thereby adjusting the out-plane rotary position of the liquid crystal panels 141R, 141G and 141B relative to the light-incident surface 151 with high accuracy.

The liquid crystal panel holder 24 holds the respective liquid crystal panels 141R, 141G and 141B, which has a basement 241 fixed by four pillars 240 projecting from the distal end of the second adjuster 23C, a base 242 screwed and fixed on the distal end side of the basement 241, a pad 243 accommodated in the base 242 so that distal end thereof being projected and being in contact with the respective liquid crystal panels 141R, 141G and 141B, and a suction device 244 for vacuum-sucking the respective liquid crystal panels 141R, 141G and 141B through the pad 243.

Figure 8:
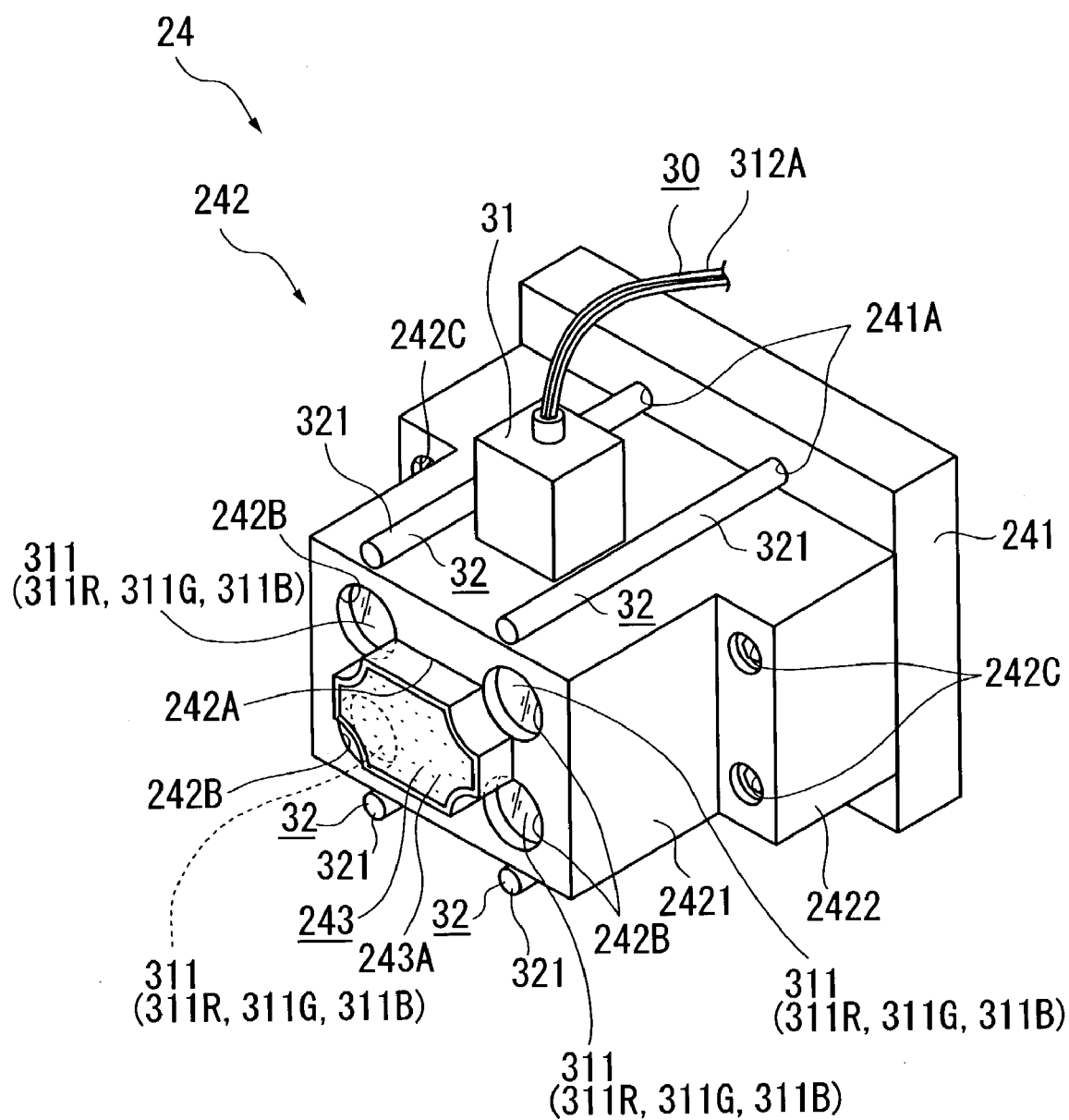
FIG. 8 is a perspective view enlarging a primary section of a liquid panel holder.

FIG. 8 is a perspective view enlarging the base 242 of the liquid crystal panel holder 24.

With reference to FIG. 8 as well as FIG. 7, a circular hole 241A for disposing light source member 321 of below described fixed light source 32 is formed at a position corresponding to the hole 143A formed on four corners of the holding frame 143 of the respective liquid crystal panels 141R, 141G and 141B on the upper and lower sides of the base 242 screwed to the distal end of the basement 241.

The base 242 is a metal hollow member of convex planar shape with the central portion being projected. A cross-shaped hole 242A for exposing the pad 243 is formed at an approximate center of the rectangular distal end surface of projected portion 2421. Around the cross-shaped hole 242A at the distal end of the projection 2421, four circular holes 242B for irradiating the light beam from below-described light source 31 toward outside are formed at a regular interval. Four screw holes 242C are formed at a bulge 2422 on the rear side of the base 242, the base 242 being screwed to the basement 241 by inserting a screw to the four screw holes 242C.

The pad 243 is a porous extendable elastic member, which has a body (not shown) accommodated in the base 242, and a cross-shaped portion 243A formed in a cross-shape, the cross-shaped portion 243A having a projected cross-shaped distal side of the size corresponding to the cross-shaped hole 242A. When the pad 243 is attached to the base 242, the cross-shaped portion 243A projects from the distal side of the base 242. Accordingly, the respective liquid crystal panels 141R, 141G 141B are not in contact with the base 242 but in contact only with the cross-shaped portion 243A of the pad 243.

Though not illustrated in detail, the suction device 244 is located around the leg 21B of the plane position adjuster 21 and is connected to the inside of the base 242 and the neighborhood of the pad 243 through a predetermined air hose 244A to hold the respective liquid crystal panels 141R, 141G and 141B to the pad 243.

As shown in FIGS. 7 and 8, the light source unit 30 supplies position-adjusting light beam and fixing light beam to the liquid crystal panels 141R, 141G and 141B, which includes an adjustment light source 31 used for position adjustment and the fixing light source 32 for fixing the adjusted liquid crystal panels 141R, 141G and 141B to the cross dichroic prism 150.

The adjustment light source 31 is for adjusting the position of the liquid crystal panels 141R, 141G and 141B, which includes four light-emitting diodes 311 as a light source, an adjustment board (not shown) for applying a predetermined electric current to the light-emitting diode 311 so that the light-emitting diode 311 appropriately emits light, and diffusion plates (not shown) respectively provided on the downstream side of the four light-emitting diodes 311 for diffusing the light emitted from the four light-emitting diodes 311 to be an appropriate light beam. Incidentally, the adjustment board is fixed at the side portion etc. of the six-axis position adjusting unit 20.

Though not specifically illustrated, the light-emitting diode 311 is constructed by a spherical casing accommodating light-emitting diode element corresponding to respective colors (red, blue and green), where a predetermined electric current is applied from the outside to the light-emitting diode element to cause electron transfer between energy levels, thereby emitting light.

Three types of diode element, i.e. red diode element emitting red light of 613 nm wavelength, green diode element emitting green light of 525 nm wavelength, and blue diode element emitting blue light of 470 nm wavelength are used as the light-emitting diode element.

Accordingly, by disposing any one of the respective diode elements in the casing, red color light-emitting diode 311R, green color light-emitting diode 311G and blue color light-emitting diode 311B can be constructed. Four color light-emitting diodes selected one of the diodes 311R, 311G and 311B are disposed in one adjustment light source 31.

Incidentally, one red-light-emitting adjustment light source 31, one blue-light-emitting adjustment light source 31 and one green-light-emitting adjustment light source 31 thus constructed are disposed in the machine 2.

In the adjustment light source 31, a part of the light-emitting diode 311 and the cable 312A is accommodated in the base 242 as shown in FIG. 8. At this time, the light-emitting diode 311 is disposed at a position corresponding to the circular hole 242B of the base 242.

The fixing light source 32 irradiates ultraviolet for curing ultraviolet curing adhesive as shown in FIG. 7, which includes a pin-shaped light source member 321 disposed respectively in the four circular holes 241A formed on the basement 241 and irradiating ultraviolet from the distal end thereof, and a fixing light source body 322 accommodated in the inside of the table 4 for supplying ultraviolet to the respective light source member 321 through a flexible pipe 322A.

When the fixing light source body 322 is actuated, ultraviolet is supplied and distributed to the respective light source member 321 through the flexible pipe 322A and the supplied ultraviolet is irradiated from the distal end of the light source member 321 to the hole 143A at the four corners of the holding frame 143 of the respective liquid crystal panels 141R, 141G and 141B.

In FIG. 5, though not fully illustrated, the light beam sensor 40 has four CCD cameras 41 and a moving mechanism 43 for independently adjusting three-dimensional position of the four CCD cameras 41.

The CCD cameras 41 are area sensor having CCD (Charge Coupled Device) as a pickup element, which take in position-adjusting light beam irradiated by the cross dichroic prism 150 and output as an electric signal.

Figure 9:
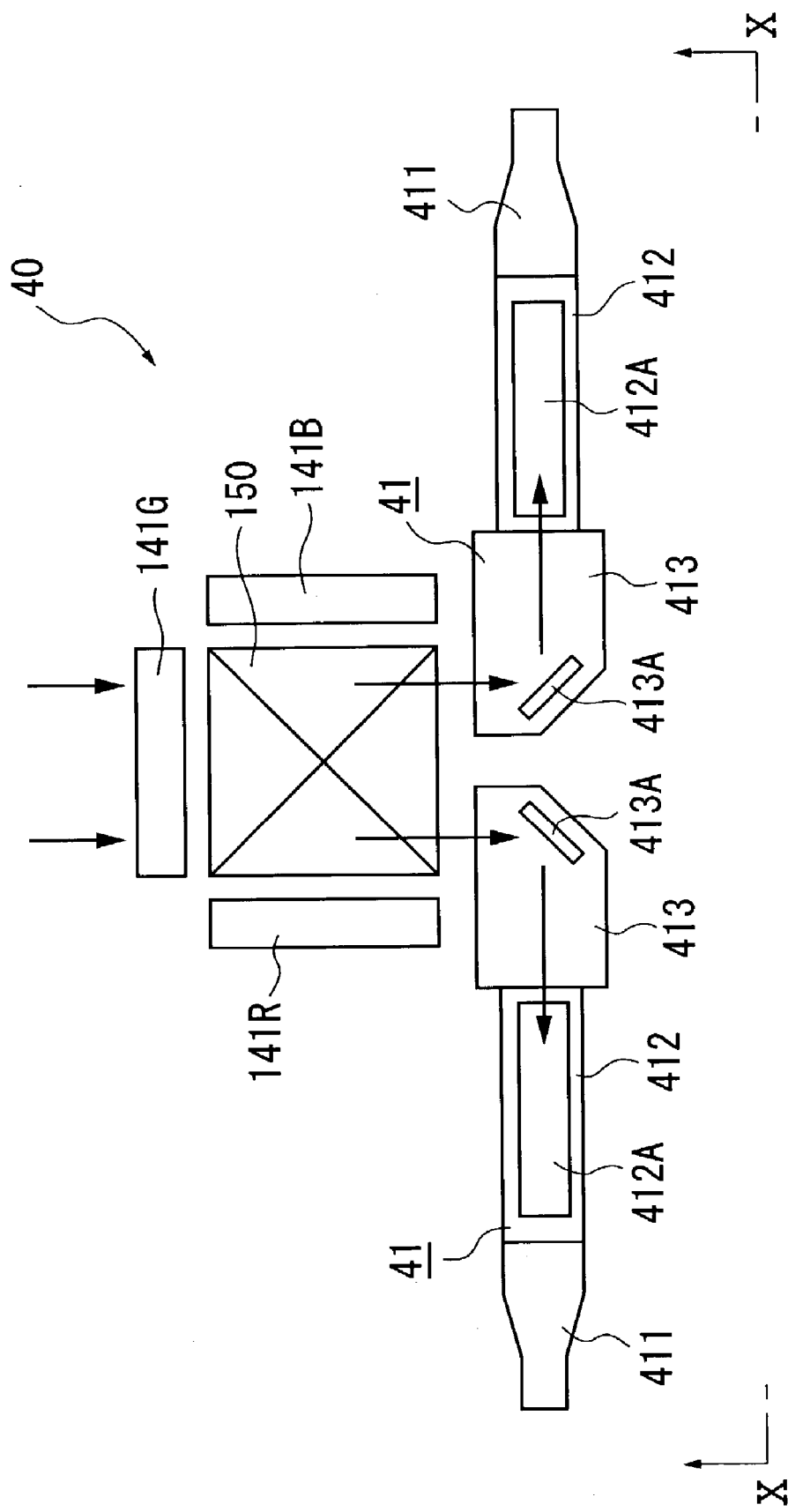
FIG. 9 is a plan schematic illustration showing a light beam sensor.

FIG. 9 is a plane schematic view showing the light beam sensor 40.

As shown in FIG. 9, the respective CCD cameras 41 has a CCD camera body 411, a casing 412 accommodating a lens 412A, and a mirror unit 413 accommodating a total reflection mirror 413A at an angle of forty five degrees relative to the light-emitting surface of the cross dichroic prism 150.

In the CCD camera 41, the light beam emitted from the cross dichroic prism 150 is introduced into the mirror unit 413 and the introduced light beam is totally-reflected in approximately perpendicularly by the total reflection mirror 413A. The totally-reflected light beam is detected by the CCD camera body 411 through the lens 412A.

Incidentally, since the lens 412A is accommodated in the casing 412 and the total reflection mirror 413A is accommodated in the mirror unit 413, the introduced light beam is not leaked toward the outside and is not influenced by external light.

FIG. 10 is a view seen from X-X in FIG. 9.

Four CCD cameras 41 are disposed through the moving mechanism 43 (FIG. 5) corresponding to the diagonal lines of the rectangular image formation area PA formed on the liquid crystal panel 141G as shown in FIG. 10. Incidentally, the zoom and focus of the CCD cameras 41 can be freely adjusted by remote control for detecting projected image with high accuracy.

As schematically shown in FIG. 5, the moving mechanism 43 has a column 431 vertically mounted on the table 4, a plurality of shafts 432 provided on the column 431 capable of adjusting three-dimensional position in six-axis direction, and a camera attachment 433 provided on the shafts 432 for the CCD camera 41 to be attached.

By the moving mechanism 43, the respective CCD cameras 41 are capable of moving in X-axis direction, Y-axis direction and Z-axis direction by a servo control mechanism provided in the table 4 as shown in FIG. 10.

Figure 11:
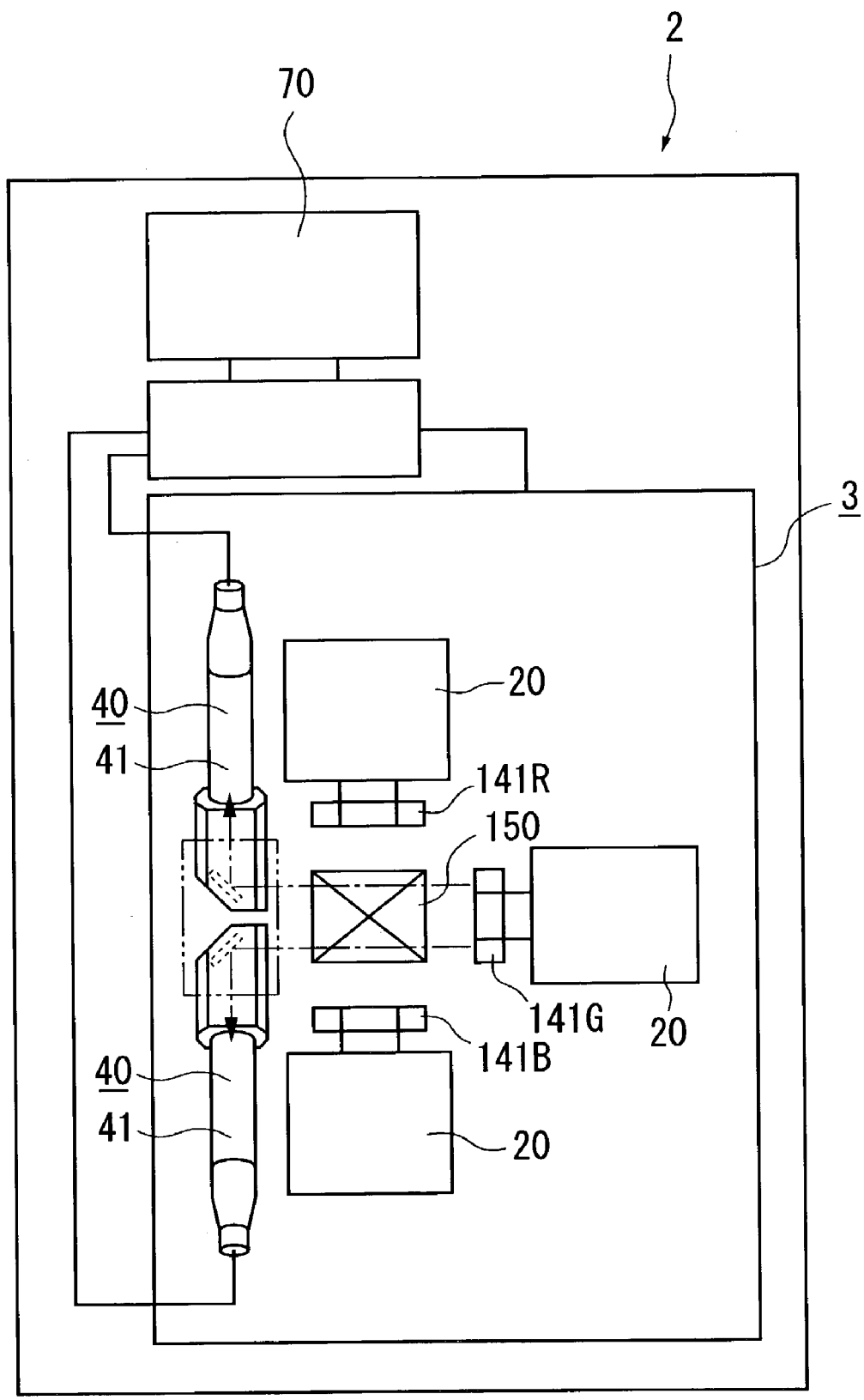
FIG. 11 is a schematic illustration of the producing machine of optical device.

FIG. 11 is an illustration schematically showing the producing machine 2 of optical device.

As shown in FIG. 11, the above-described machine body 3 is electrically connected with a computer 70. The computer 70 has CPU, storage etc., which controls operation of the six-axis position adjusting unit 20 and the light beam sensor 40 and conducts image-processing of the light beam detected by the CCD camera 41 of the light beam sensor 40.

Figure 12:
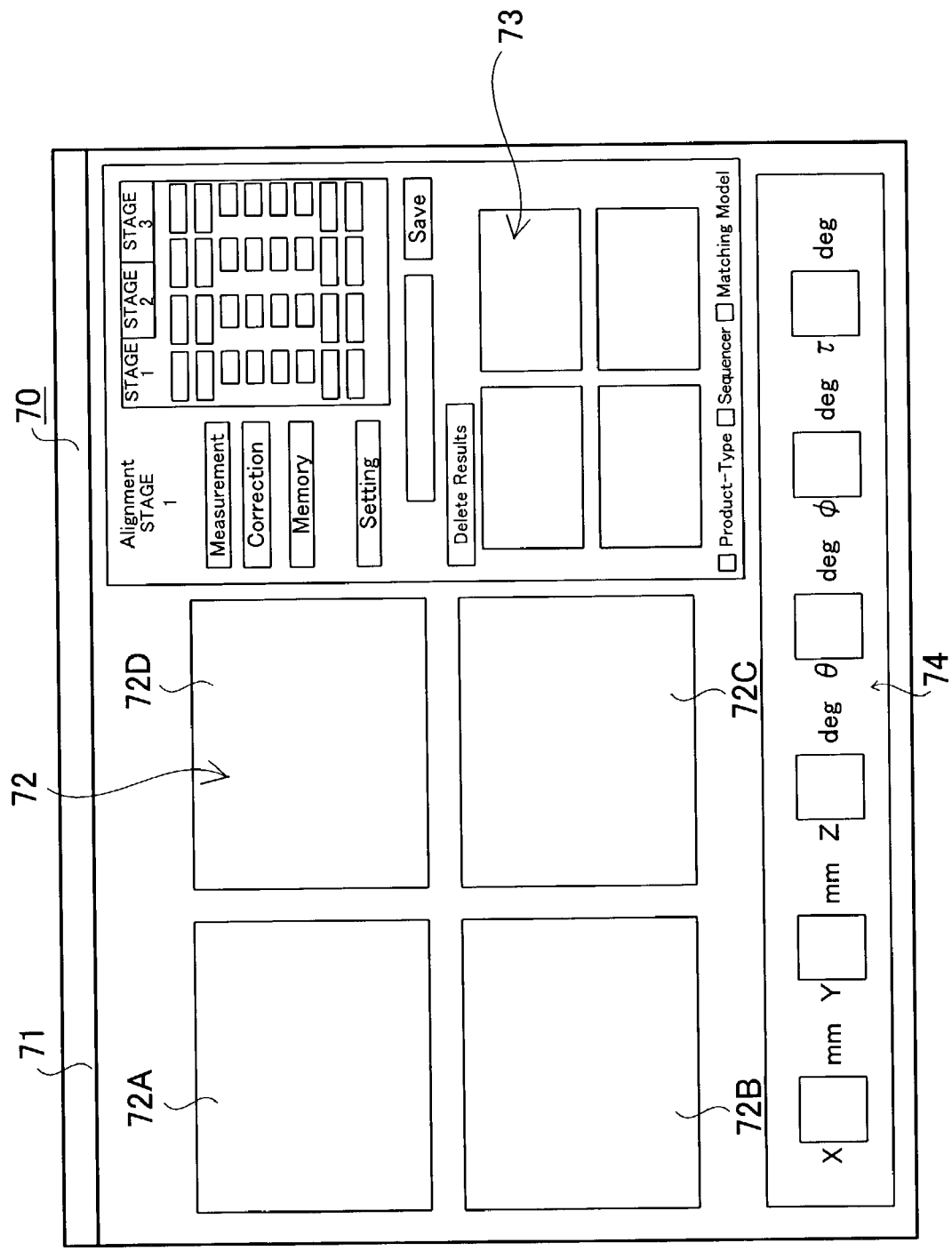
FIG. 12 is an illustration schematically showing a display screen of a computer.

FIG. 12 is an illustration showing a display screen 71 of the computer 70.

The program called by the computer 70 displays the display screen 71 shown in FIG. 12, and the focus and alignment are adjusted based on various information displayed on the display screen 71.

The display screen 71 has an image display view 72 for directly displaying the image from the position-adjusted respective CCD cameras 41, an image processing view 73 for conducting pattern matching processing based on a reference pattern image, and a shaft movement display view 74 for displaying adjustment amount of the respective shaft of the six-axis position adjusting unit 20 after the image-processing. Incidentally, the images obtained from the light beam on the four corners are displayed on the respective image display areas 72A to 72D of the image display view 72.

5. Structure of Positioning Master

Figure 13:
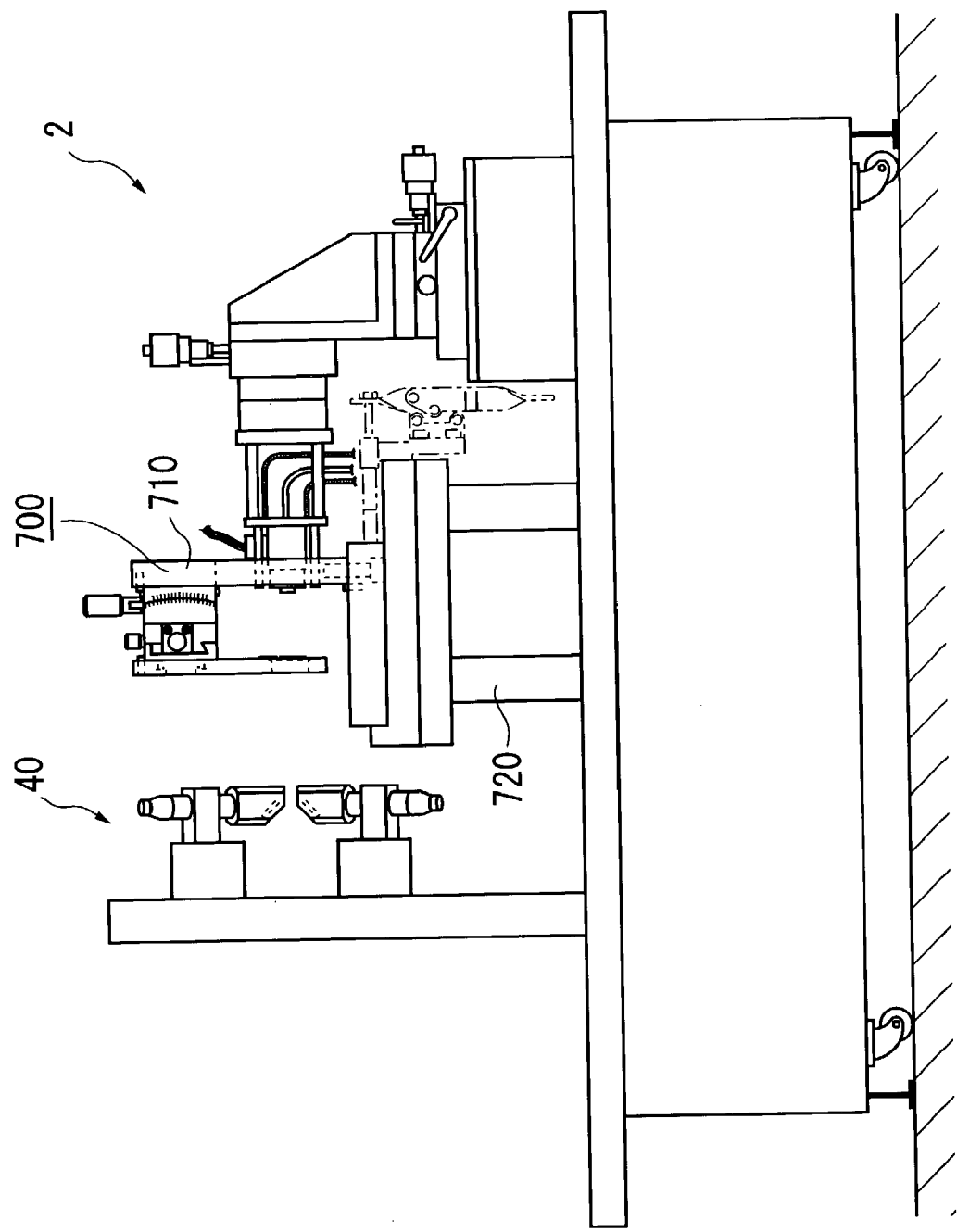
FIG. 13 is a side elevational view showing an optical device producing machine on which a positioning master is mounted.
Figure 14:
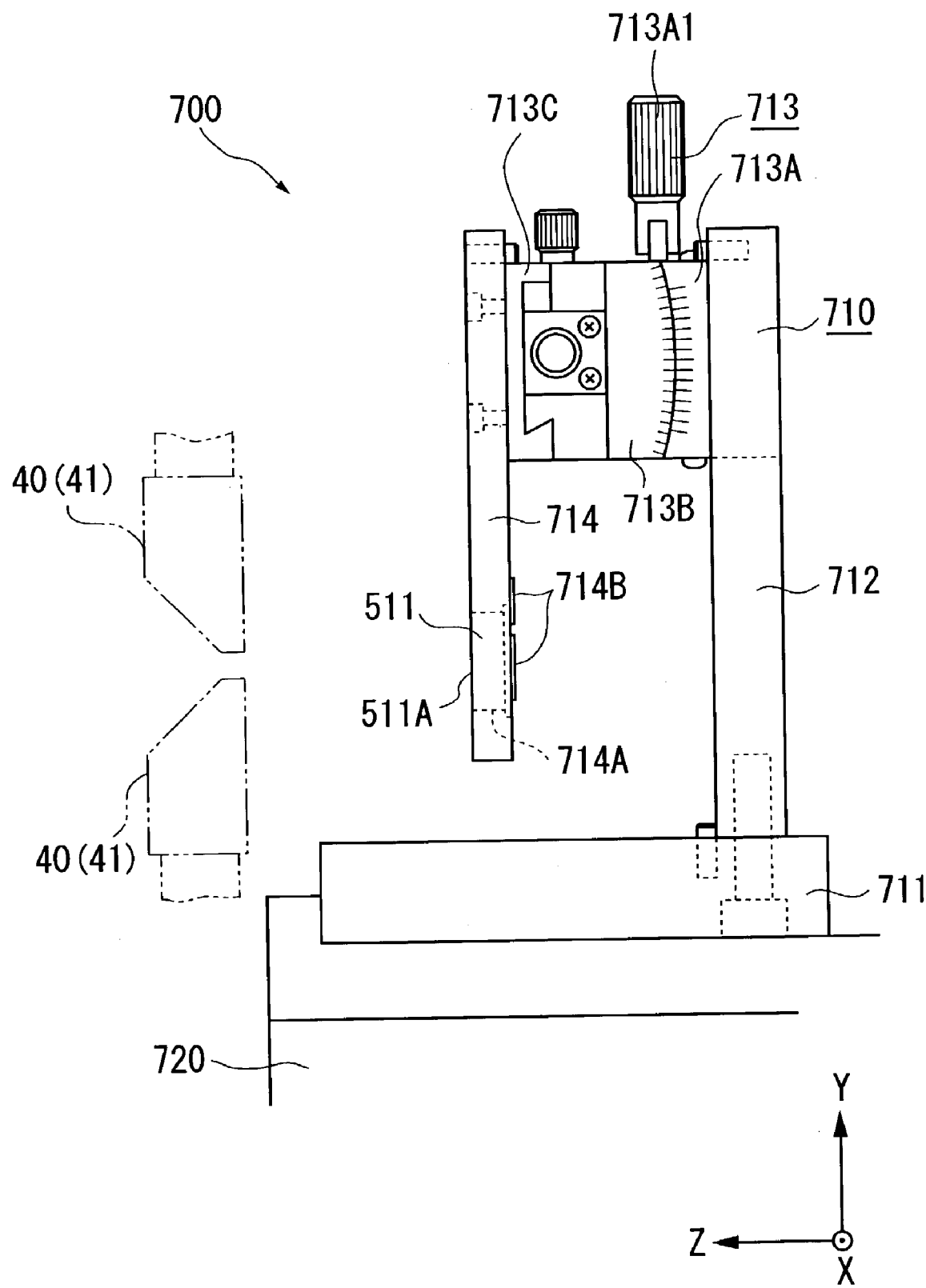
FIG. 14 is a side elevational view showing the positioning master.
Figure 15:
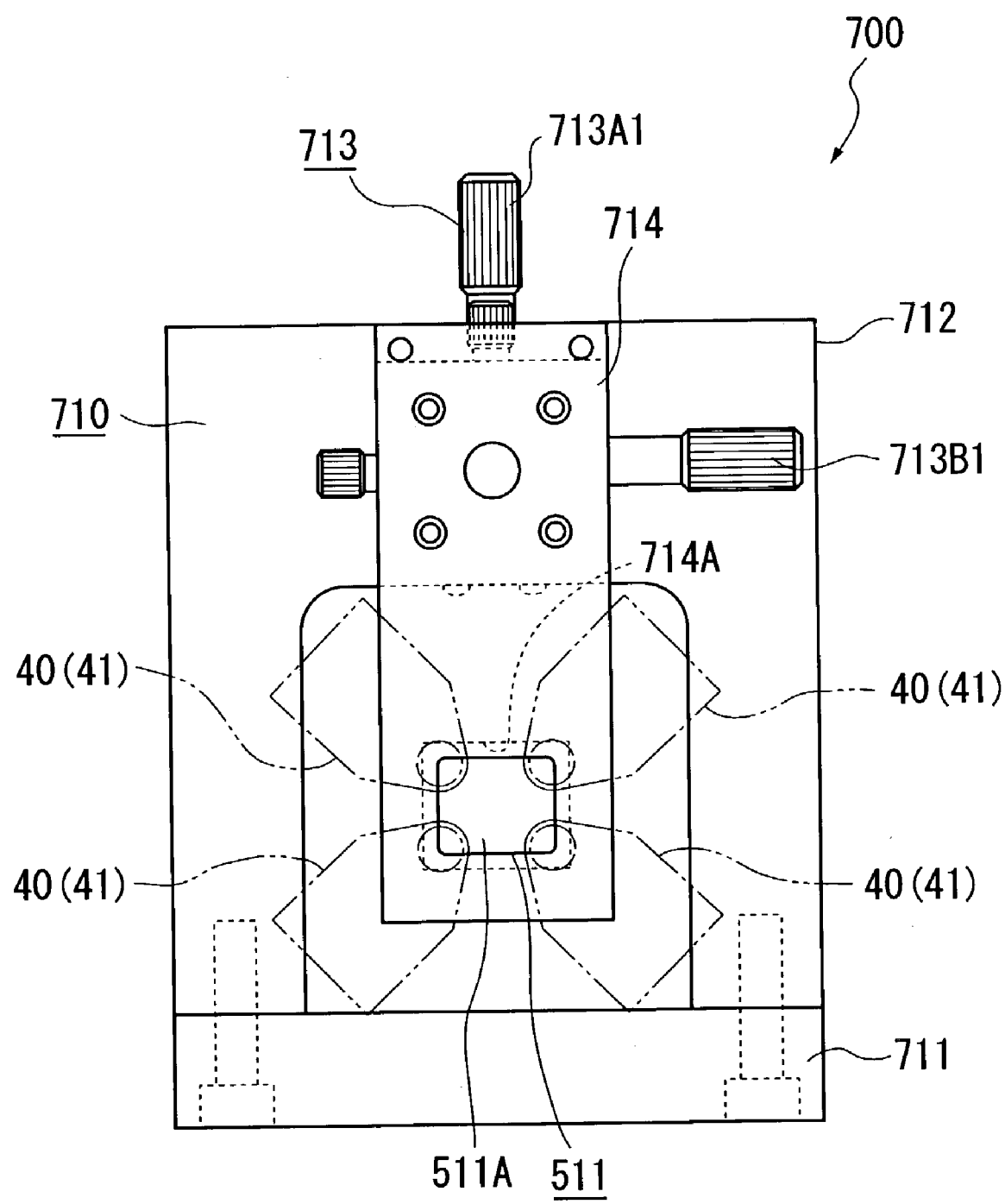
FIG. 15 is a front elevational view showing the positioning master.
Figure 16:
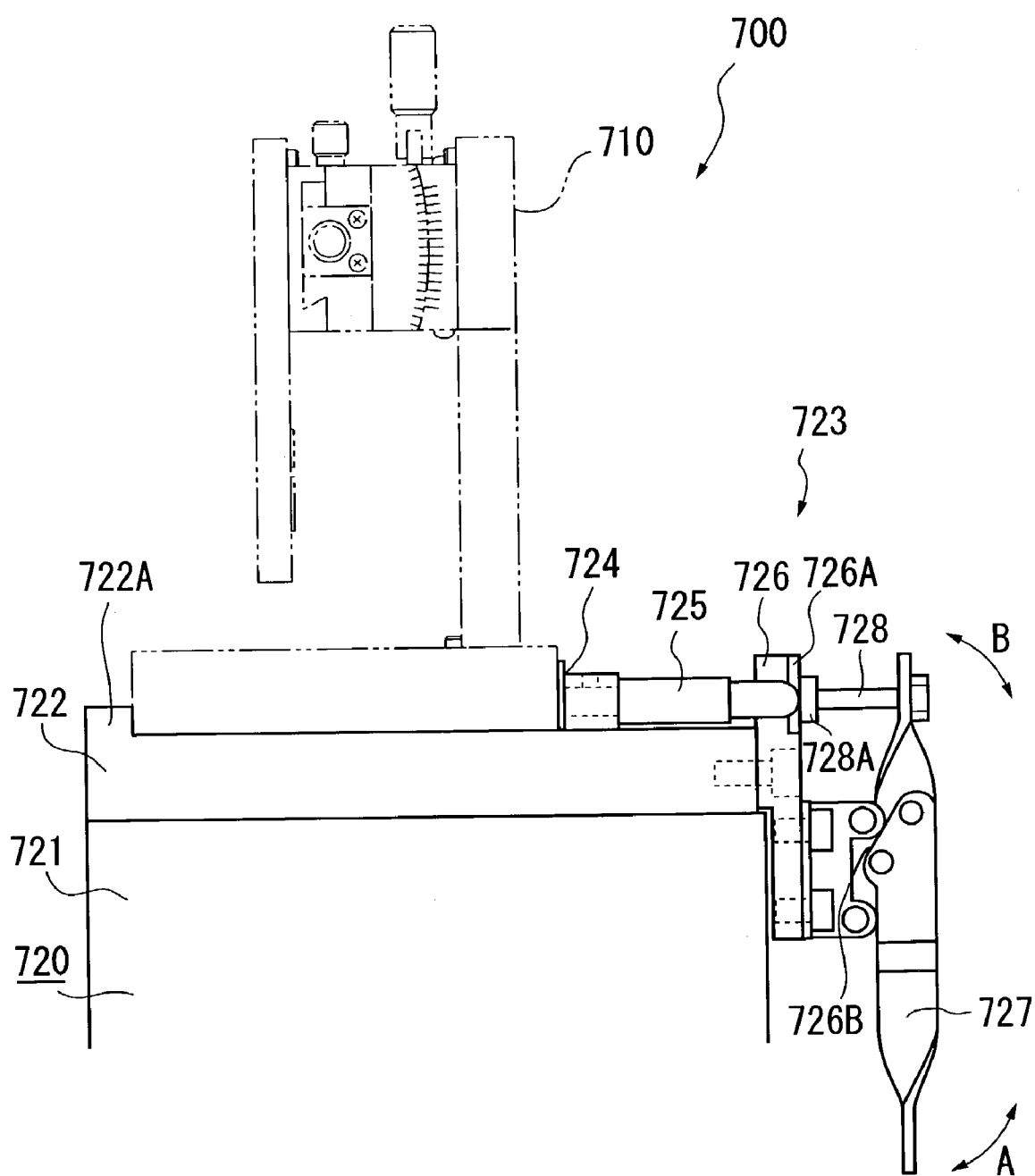
FIG. 16 is a side elevational view showing a pedestal of the positioning master.
Figure 17:
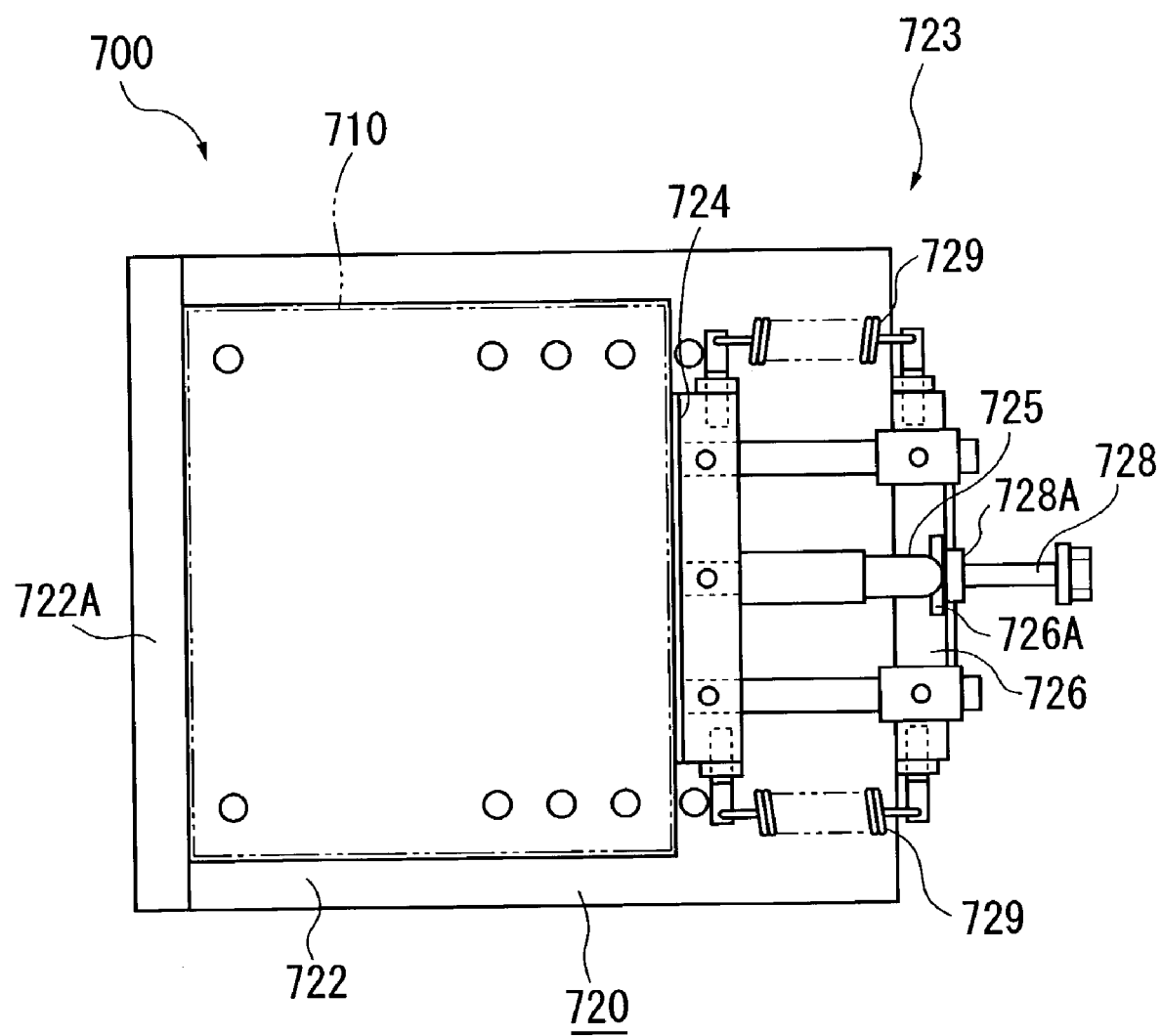
FIG. 17 is a plan view showing the pedestal.

Next, a positioning master 700 will be described below with reference to FIGS. 13 to 17. FIG. 13 is a side elevational view showing the producing machine 2 of optical device installed with the positioning master 700. FIG. 14 is a side elevational view of the positioning master 700 and FIG. 15 is a front elevational view thereof. FIG. 16 is a side elevational view showing a pedestal 720 of the positioning master 700 and FIG. 17 is a plan view thereof.

As shown in FIG. 13, the positioning master 700 is a prototype that is disposed instead of the pedestal 10 (FIG. 5) and the optical device 180 (FIG. 5) mounted on the pedestal 10 in the producing machine 2 for specifying the reference position of the light beam sensor 40, which includes a master body 710 having a portion to be a measurement reference surface and a pedestal 720 for supporting and fixing the master body 710.

The master body 710 is attachable to and detachable from the pedestal 720, which includes rectangular plate basement 711 supported by the pedestal 720, a column 712 vertically mounted on the basement 711, an adjusting unit 713 provided on the upper distal portion of the column 712 as an attitude adjuster, and a holding frame 714 provided on the upper distal portion of the adjusting unit 713 to hold the same component as the test sheet 511 used in the projection lens inspection apparatus 500 as shown in FIGS. 14 and 15. Incidentally, the front side of the test sheet 511 is a measurement reference surface 511A.

The adjusting unit 713 adjusts the direction of the holding frame 714 relative to the pedestal 720 and the basement 711 to adjust the direction of the measurement reference surface 511A of the test sheet 511 provided to the holding frame 714.

The adjusting unit 713 is provided on the upper distal portion of the column 712, which includes a base 713A having vertically arched concave curve at a distal end, a first adjuster 713B being slidable along the arch of the concave curve of the base 713A and having horizontally arched concave curve at a distal end thereof, and a second adjuster 713C being slidable along the arch of the concave curve of the first adjuster 713B and having the holding frame 714 at a distal end thereof.

The first adjuster 713B is slid when a micrometer head 713A1 provided on the upper side of the base 713A of the adjusting unit 713 is rotated, and the second adjuster 713C is slid when a micrometer head 713B1 provided on the side of the first adjuster 713B is rotated, thereby adjusting the direction of the measurement reference surface 511A of the test sheet 511 relative to the pedestal 720 and the basement 711 with high accuracy.

As shown in FIGS. 14 and 15, the holding frame 713 is a plate member having an opening 714A for holding the test sheet 511 at the center of the lower side thereof, which holds (fixes) the test sheet 511 to the opening 714A with two claws 714B provided around the opening 714A.

The opening 714A is formed in a dimension capable of exposing the portion of the test sheet 511 corresponding to the image formation area of the liquid crystal panels 141R, 141G and 141B.

The pedestal 720 securely supports and fixes the master body 710 on the upper side thereof, which includes a pedestal body 721, an upper plate 722 horizontally situated on the upper portion of the pedestal body 721 and mounted with the master body 710 on the upper side thereof, and a clamp 723 provided on the rear side of the upper plate 722, as shown in FIGS. 16 and 17.

A projection 722A projecting upward for the distal portion of the master body 710 to be touched when the master body 710 is mounted on the upper side is formed on the left distal portion of the upper plate 722.

The clamp 723 is for biasing the master body 710 mounted on the upper side of the upper plate 722 toward the projection 722A to fix at a predetermined position of the upper plate 722 and releasing the biasing to enable detachment of the master body 710. In other words, the clamp 723 is for switchable set the master body 710 to be attachable and detachable.

The clamp 723 includes a slide member 724 slidable in right and left direction along the upper side of the upper plate 722, a shaft 725 fixed approximately at the center of the slide member 724, a fixing member 726 fixed on the rear side of the upper plate 722, an operation member 727 attached to the fixing member 726 in a manner rotatable in the direction of arrow A, a bolt 728 attached to the operation member 727 in a manner rotatable in the direction of arrow B, and a spring 729 (see FIG. 17) for connecting the slide member 724 and the fixing member 726 at the both end side (upper and lower end in FIG. 16).

A hole 726A for fixing a distal portion 728A of the bolt 728 is formed on the upper side of the fixing member 726 at a position corresponding to the right distal portion of the shaft 725 in the figure. Further, an engaging portion 726B to be engaged with a part of the operation member 727 to fix the operation member 727 is formed on the lower side of the fixing member 726.

The bolt 728 is for biasing the right distal portion of the shaft 725 toward left side when the distal portion 728A is attached to the hole 726A.

The spring 729 is a member for pulling the slide member 724 in parallel in the right direction in FIG. 16.

In the clamp 723, after attaching the distal portion 728A of the bolt 728 to the hole 726A of the fixing member 726, when the operation member 727 is turned to engage a part of the operation member 727 with the engaging portion 726B of the fixing member 726, the distal portion 728A of the bolt 728 biases the shaft 725 to the left. Accordingly, the slide member 724 is biased leftward. At this time, the slide member 724 touches the right side of the master body 710 mounted on the upper side of the upper plate 722 to bias leftward, thereby securely fixing the master body 710 to the upper side of the upper plate 722 (biased condition). At this time, the spring 729 is stretched.

On the other hand, when the operation member 727 is turned to release the engagement of the part of the operation member 727 with the engaging portion 726B of the fixing member 726 and the distal portion 728A of the bolt 728 is detached from the hole 726A of the fixing member 726, the distal portion 728A of the bolt 728 stops biasing and the shaft 725 is moved rightward on account of contraction of the stretched spring 729. Accordingly, the slide member 724 moves rightward in accordance with the movement of the shaft 725. At this time, the slide member 724 and the master body 710 are mutually separated so that the master body 710 can be detached from the upper plate 722 (released condition).

[6. Structure of Prism Inspection Apparatus]

Figure 18:
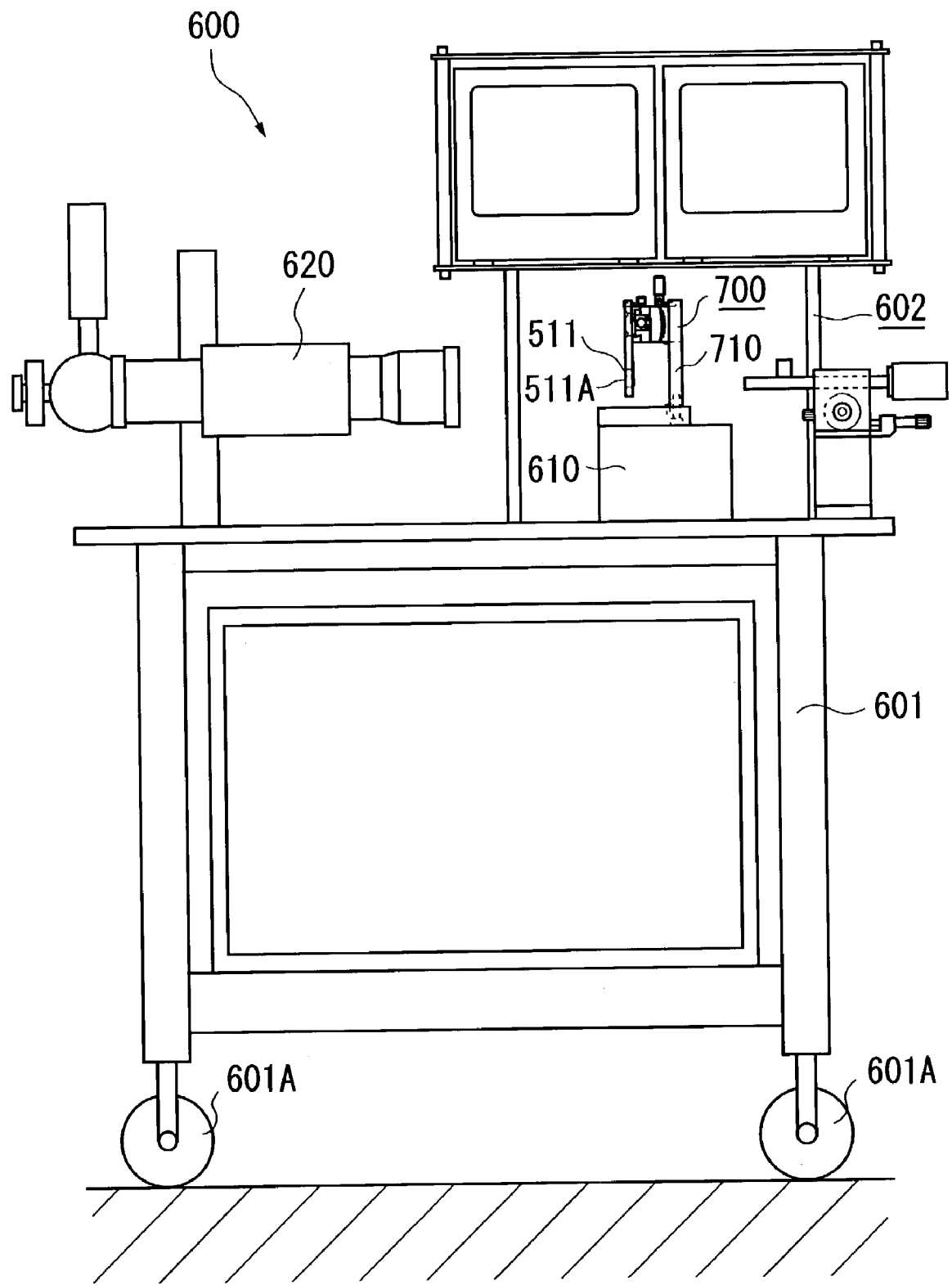
FIG. 18 is a front elevation showing a prism inspection apparatus.

FIG. 18 is a front elevation showing a prism inspection apparatus 600.

As shown in FIG. 18, the prism inspection apparatus 600 has a pedestal 610 and an auto-collimator 620, where, originally, the prism unit 154 (FIG. 3) is disposed on the pedestal 610 through a predetermined jig etc. and the relative position of the four reflection surfaces of the cross dichroic prism 150 of the prism unit 154 and the manufacturing accuracy of the prism unit 154 is tested with the auto-collimator 620. However, in the present embodiment, the pedestal 610 as a part of the prism inspection apparatus 600 and the auto-collimator 620 are used to vertically set the measurement reference surface 511A of the test sheet 511 in the master body 710 of the positioning master 700. Accordingly, only a part of the inspection apparatus 600 will be described below.

As shown in FIG. 18, the prism inspection apparatus 600 has a movable test table 601 having a castor 601A on the lower side thereof, and a inspection apparatus body 602 mounted on the test table 601.

The inspection apparatus body 602 has the pedestal 610 for the master body 710 of the positioning master 700 to be mounted, and the auto-collimator 620 fixed on the test table 601 being opposed to the measurement reference surface 511A of the test sheet 511 mounted on the pedestal 610.

Though not specifically illustrated, the pedestal 610 is a member for disposing and fixing an optical component at a predetermined position through various jig etc. corresponding to the shape of the optical component such as the prism unit 154. The master body 710 is mounted and fixed on the pedestal 610 in the present embodiment.

Figure 19:
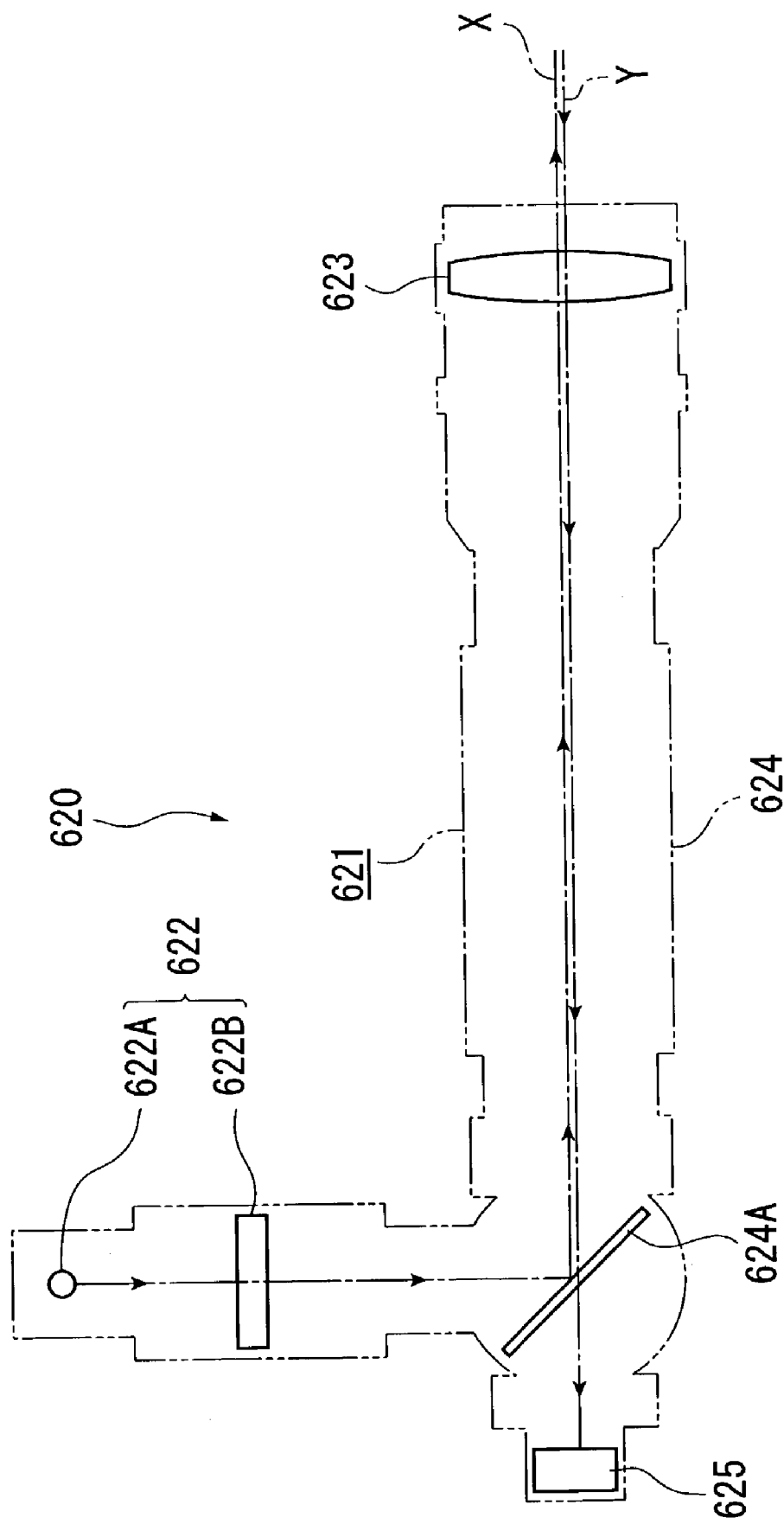
FIG. 19 is a schematic illustration of an auto-collimator.

As shown in FIG. 19, the auto-collimator 620 is a device for introducing measurement light X approximately perpendicularly to the measurement reference surface 511A of the test sheet 511 of the master body 710 and detecting reflection light Y of the introduced measurement light X, which includes an auto-collimator body 621 and a CCD camera 625.

The auto-collimator body 621 has a light source unit 622 for irradiating the measurement light X, an objective lens 623 for emitting the measurement light X irradiated by the light source unit 622 as a parallel light beam, and a light guide 624 for guiding the measurement light X irradiated by the light source unit 622 and the reflection light Y of the measurement light X.

The light source unit 622 is disposed at the back focus position of the objective lens 623 and has a light source 622A for irradiating the measurement light X as a halogen light, and a chart 622B formed with "+" shaped transmission hole. The measurement light X irradiated by the light source 622A passes through the chart 622B to be irradiated to the light guide 624 as the measurement light X having "+" shape.

The light guide 624 has a half mirror 624A disposed approximately at forty five degrees relative to the chart 622B of the light source unit 622. The measurement light X irradiated by the light source unit 622 is converted into parallel light beam by the objective lens 623 after being reflected by the half mirror 624A.

The CCD camera 625 is a device for detecting reflection light Y of "+" shape and includes a CCD as a pickup element. The CCD camera 625 is electrically connected with a computer (not shown). Accordingly, after the reflection light Y is detected by the CCD of the CCD camera 625 as an image signal, the detected image signal is imported by the computer for image-processing the image signal.

Figure 20:
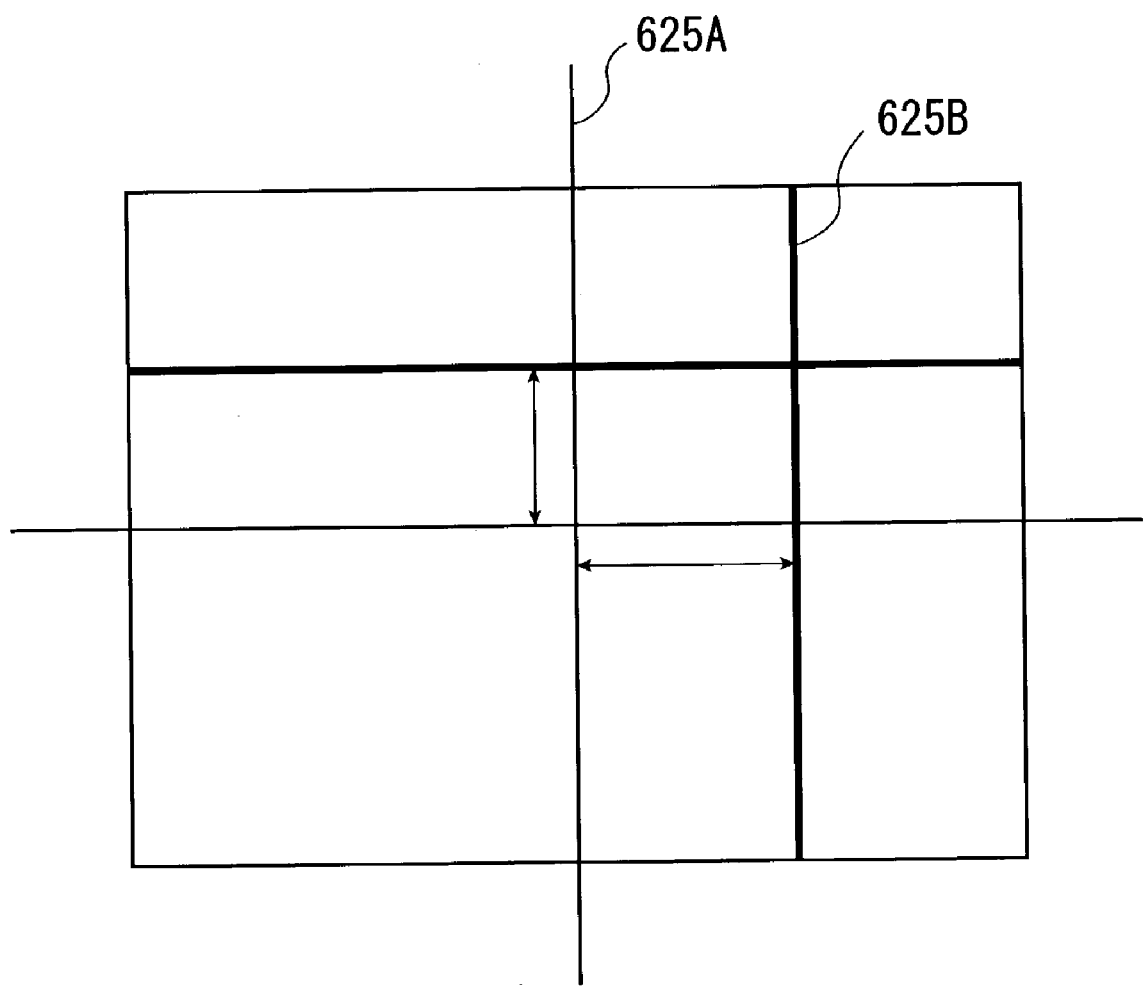
FIG. 20 is an illustration showing a display screen.

FIG. 20 shows a screen of the computer showing that a reference line 625A indicating the position of the measurement light X and a measurement line 625B indicating the reflection light Y are shifted. In this case, the direction of the measurement reference surface 511A of the test sheet 511 is adjusted by the adjusting unit 713 (FIG. 14) so that the lines 625A and 625B are aligned, thereby obtaining vertical position of the measurement reference surface 511A of the test sheet 511 relative to the pedestal 720.

[7. Producing Steps of Optical Device]

Figure 21:
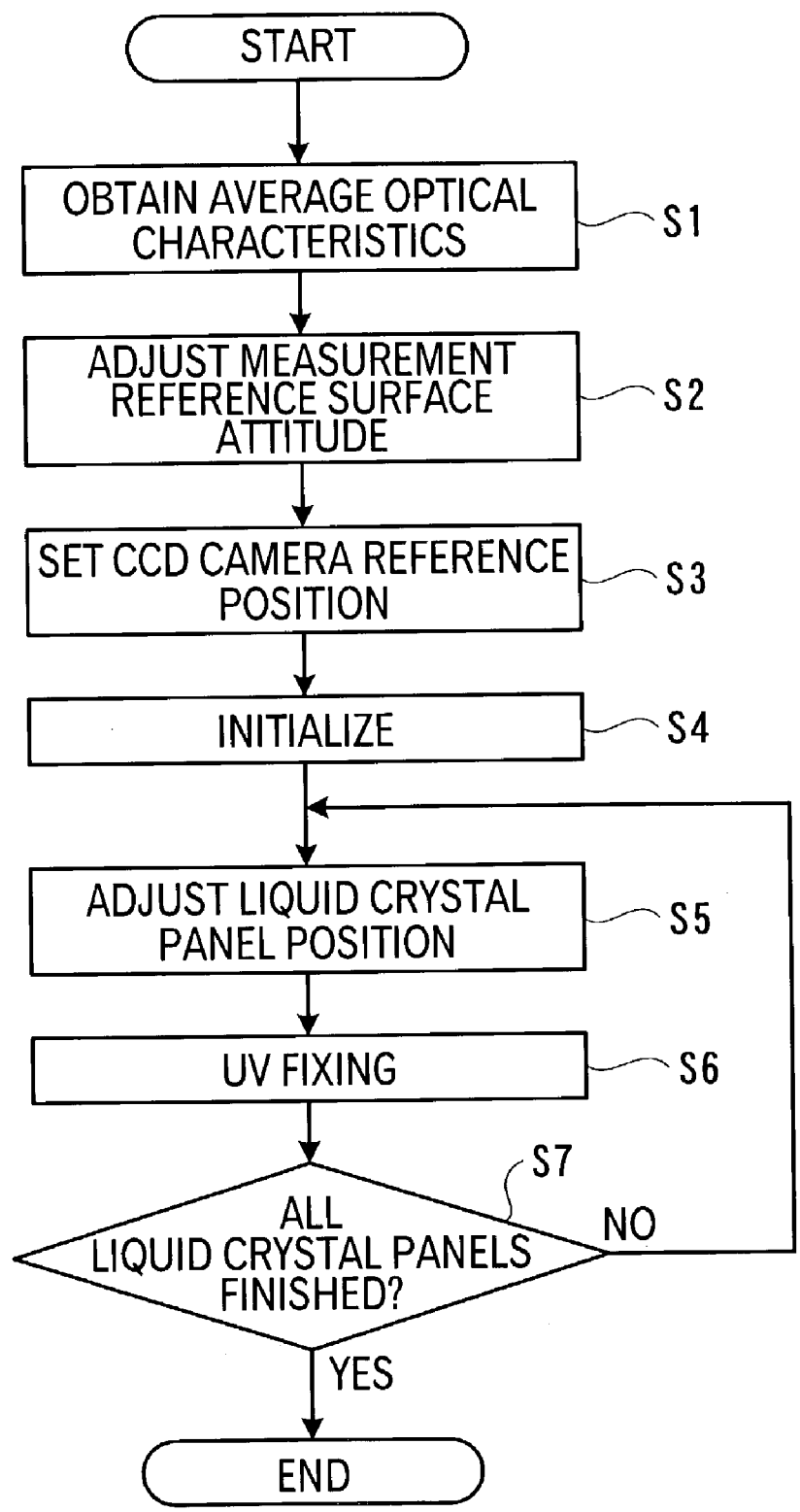
FIG. 21 is a flowchart for showing a producing method of the optical device.

Next, a method for producing the optical device 180 by adjusting the position of the liquid crystal panels 141R, 141G and 141B relative to the cross dichroic prism 150 in the producing machine 2 of optical device will be described below with reference to flowchart shown in FIG. 21.

Figure 22:
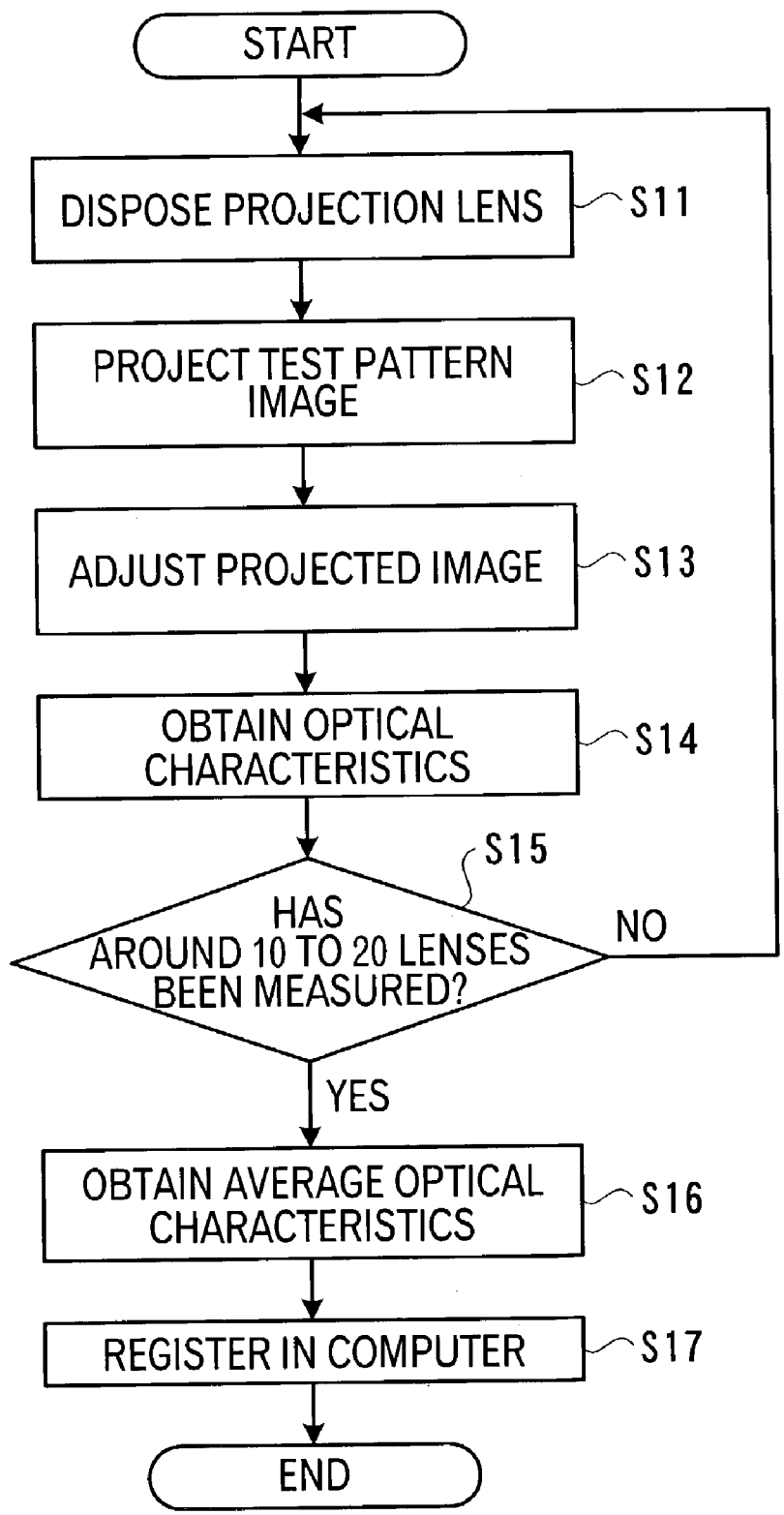
FIG. 22 is a flowchart for showing a part of the producing method of the optical device.

(1) Initially, as a preliminary step, average optical characteristics of the projection lens 160 to be combined with the optical device 180 such as axial chromatic aberration, resolution and inclination of the projected image is obtained (step SI), which is specifically conducted according to the flowchart shown in FIG. 22.

(1-1) Initially, using a projection lens inspection apparatus 500, the projection lens 160 to be installed in the projector 100 is disposed in the projecting portion 510 (step S11).

(1-2) The light beam irradiated from the light source and passing through a predetermined test pattern is introduced into the projection lens 160 and the test pattern image formed by the light beam is projected on the screen 530 through the mirror 520 (step S12).

(1-3) The three-dimensional position of the projecting portion 510 is adjusted by the processor 542 to adjust the projected image while taking in the projected test pattern image with four adjustment pickups 540a to 540d (step S13).

(1-4) The test pattern image is taken in by the measurement pickup 541 and the optical characteristics of the projection lens 160 are obtained by the processor 542 based on the pickup signal (step S14).

(1-5) The above steps S11 to S14 are conducted for ten to twenty projection lenses 160 (step S15).

(1-6) The plurality of optical characteristics are averaged to obtain the average optical characteristics of the projection lens (step S16).

(1-7) Thus obtained average optical characteristics are registered in the storage of the computer 70 of the producing machine 2 (step S17).

Figure 23:
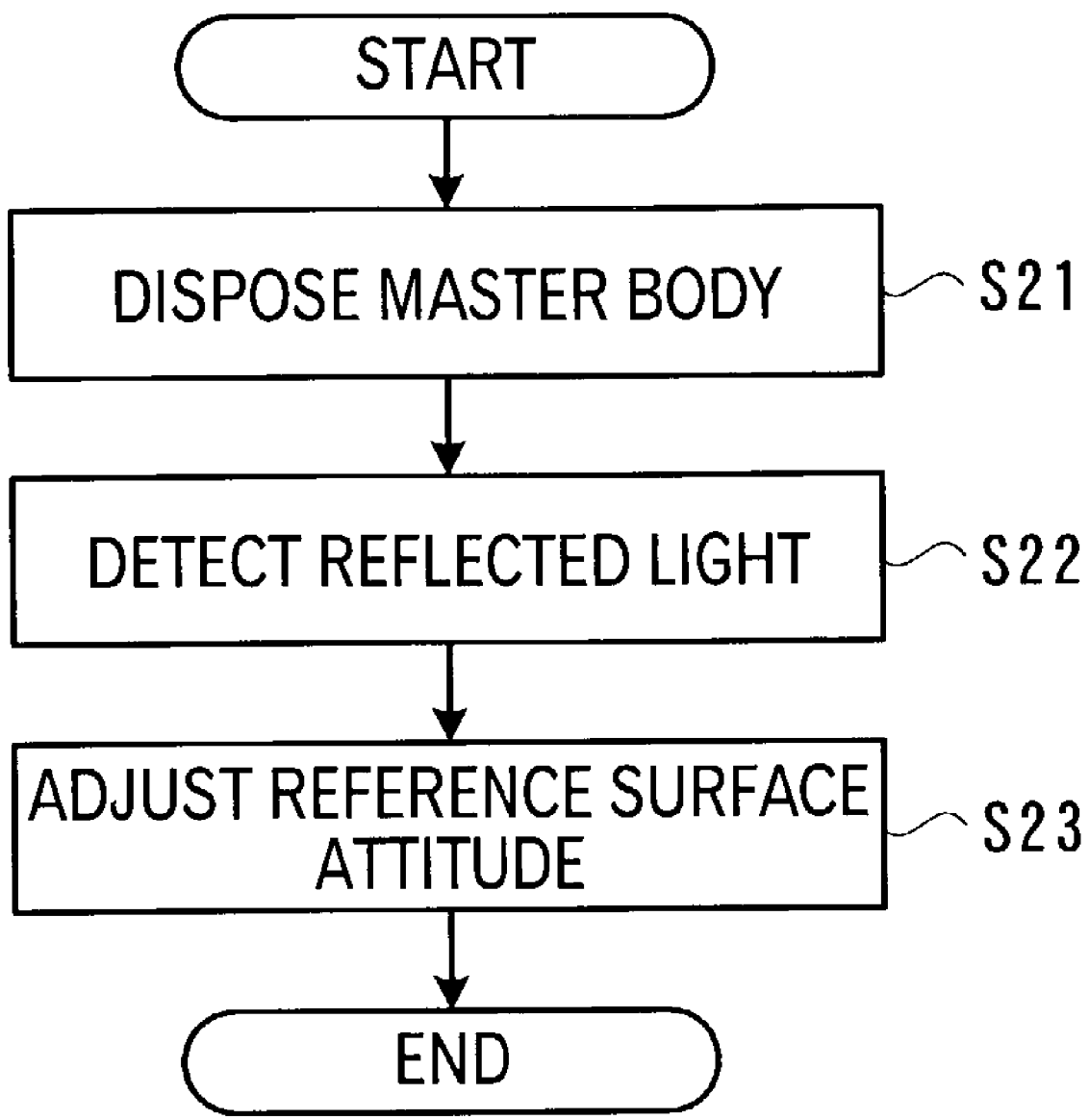
FIG. 23 is a flowchart showing a part of the producing method of the optical device.

(2) Next, the attitude of the measurement reference surface 511A of the test sheet 511 of the positioning master 700 is adjusted using the prism inspection apparatus 600 (step S2; reference surface attitude adjusting step), which is specifically conducted according to the flowchart shown in FIG. 23.

(2-1) Only the master body 710 of the positioning master 700 is taken, and the master body 710 is disposed at a predetermined position of the pedestal 610 of the prism inspection apparatus 600 so that the measurement reference surface 511A of the test sheet 511 opposes the auto-collimator 620 (step S21).

(2-2) Measurement light X is introduced from the auto-collimator 620 to the measurement reference surface 511A of the test sheet 511 of the master body 710 and the reflection light Y reflected by the measurement reference surface 511A of the test sheet 511 is detected by the CCD camera 625 (step S22).

(2-3) While checking the result detected by the CCD camera 625 on the computer screen, the adjusting unit 713 is operated to bring the image of the "+" shape image of the reflection light Y coincide with the reference position indicating the position of the measurement light X and the attitude of the test sheet 511 is adjusted and fixed (step S23). Accordingly, the measurement reference surface 511A of the test sheet 511 becomes orthogonal with the light beam X and Y (illumination optical axis), in other words, orthogonal with the basement 711 abutting the pedestal 610.

Figure 24:
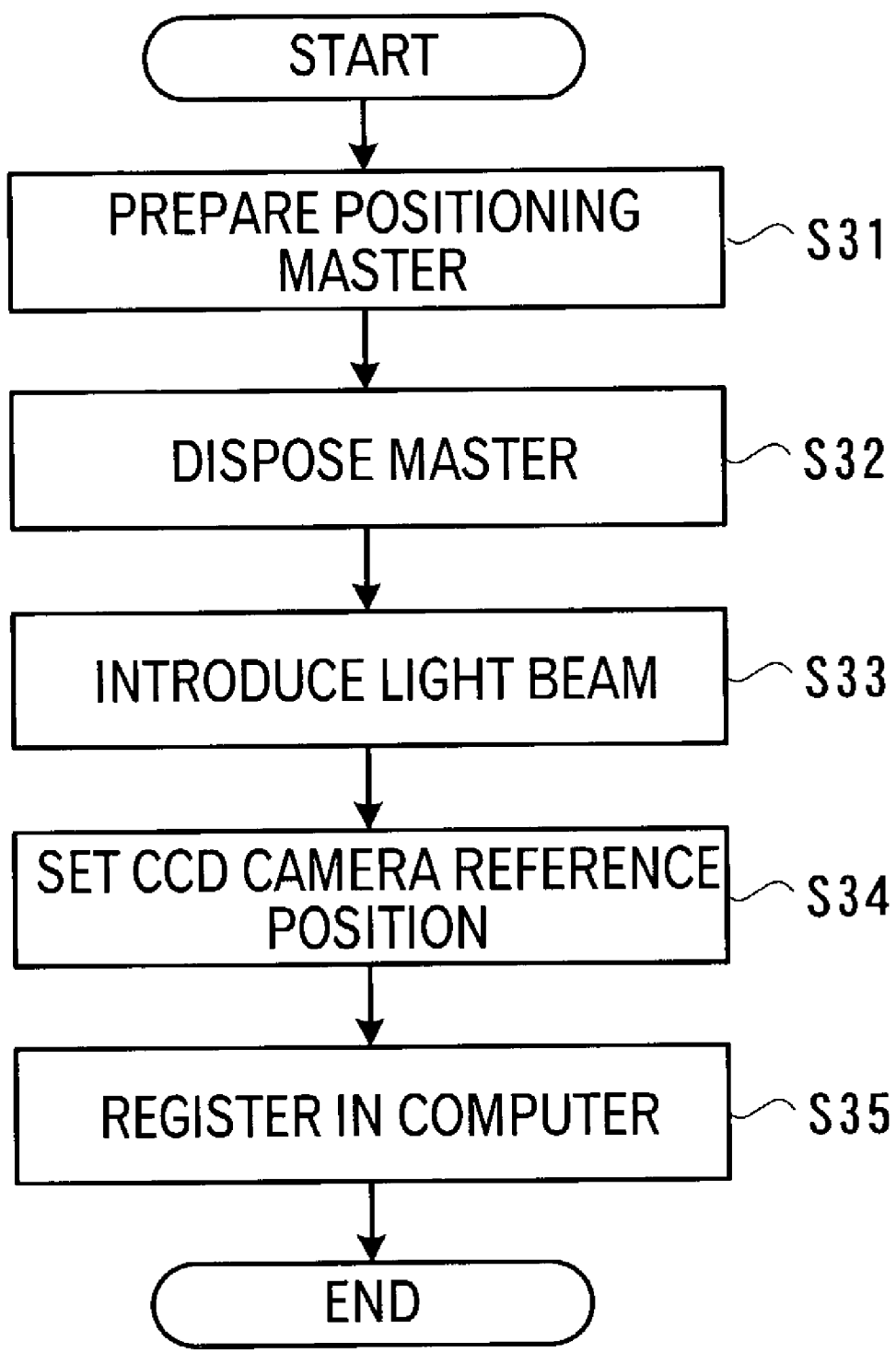
FIG. 24 is a flowchart showing a part of the producing method of the optical device.

(3) Next, as shown in FIG. 13, thus adjusted master body 710 is situated at a predetermined position of the producing machine 2 and the light beam irradiated by the measurement reference surface 511A is detected by the light beam sensor 40 to set the reference position of the light beam sensor 40 (step S3; reference position setting step), which is specifically conducted according to the flowchart shown in FIG. 24.

(3-1) The master body 710 with the attitude of the measurement reference surface 511A of the test sheet 511 being adjusted is detached from the pedestal 610 of the prism inspection apparatus 600 and is attached to the pedestal 720 of the positioning master 700 by operating the clamp 723 etc. to restore the original positioning master 700 (step S31).

(3-2) The positioning master 700 is disposed so that the measurement reference surface 511A of the test sheet 511 is located at the cross position of the reflection surfaces of the cross dichroic prism 150, i.e. at the center of the cross dichroic prism 150 (step S32).

(3-3) Adjustment green light from the four light-emitting diode 311G of the green-light-emitting adjustment light source 31 out of the plurality of adjustment light source 31 is introduced from the backside of the measurement reference surface 511A of the test sheet 511 (step S33).

(3-4) The image light introduced from the backside and passed through the measurement reference surface 511A, the image light including a predetermined test pattern, is directly detected by the four CCD cameras 41 of the light beam sensor 40. At this time, the moving mechanisms 43 corresponding to the respective CCD cameras 41 are respectively actuated to move the CCD camera 41 to a position capable of securely receiving the image light and the focus position of the image light is set as the reference position (step S34).

(3-5) Thus obtained reference position of the CCD camera 41 is registered in the storage of the computer 70 (step S35).

Figure 25:
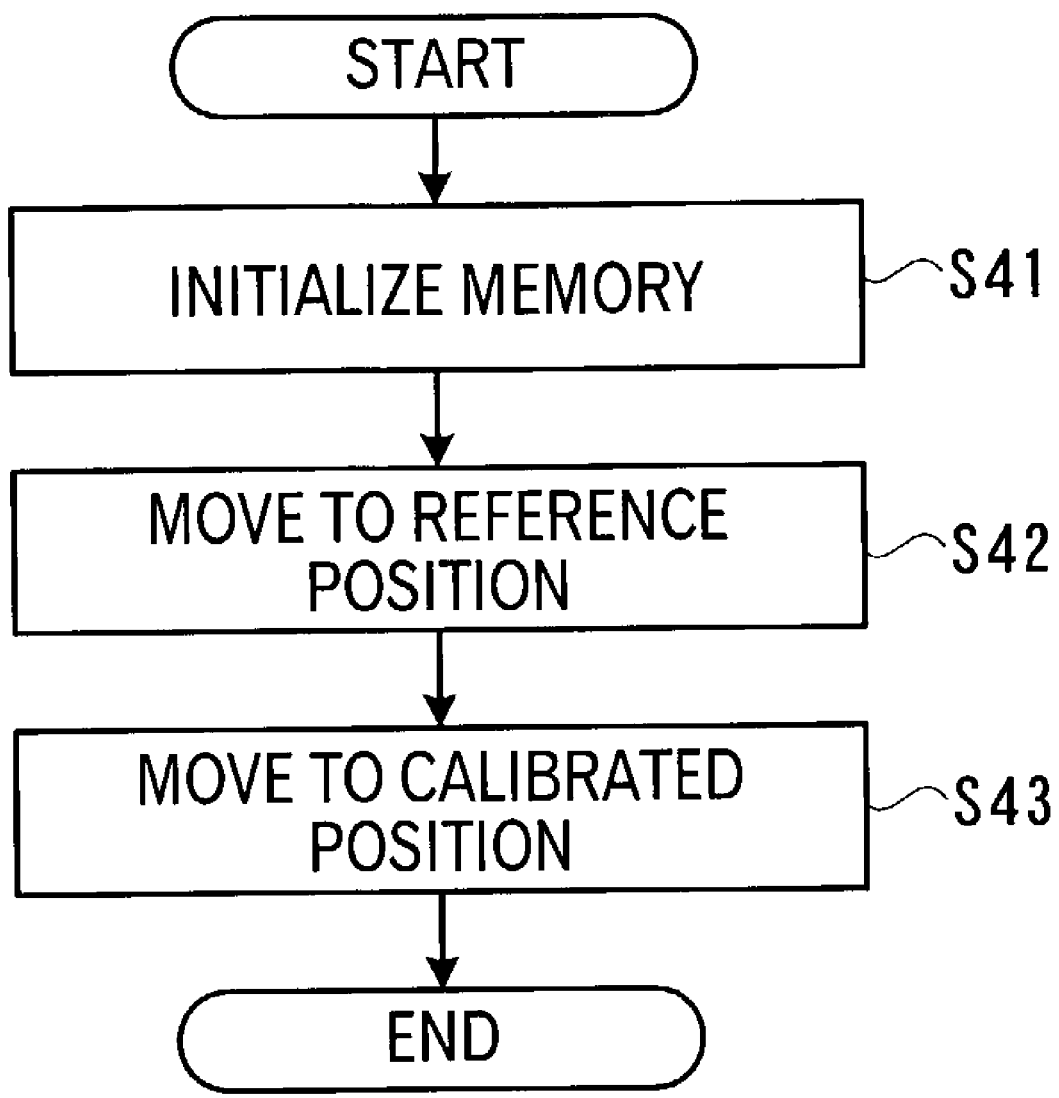
FIG. 25 is a flowchart showing a part of the producing method of the optical device.

(4) After conducting the above preliminary steps of S1 to S3 in advance, keyboard or mouse of the computer 70 is operated to conduct initialization by the program executed by the CPU, which is specifically conducted according to the flowchart shown in FIG. 25.

(4-1) Memory such as RAM (Random Access Memory) is initialized (step S41).

(4-2) The reference position data registered in accordance with the type of the optical device 180 to be produced is fetched and the respective CCD cameras 41 are moved to the reference position (step S42).

(4-3) The average optical characteristics registered in the step S1 is fetched and the calibrated position of the respective CCD cameras 41 relative to the reference position is set based, especially, on the inclination of the projected image surface out of the average optical characteristics. The CCD cameras 41 are moved to the calibrated position to be fixed (step S43; calibrated position moving step).

After terminating the initializing process, the optical device 180 can be produced.

Figure 26:
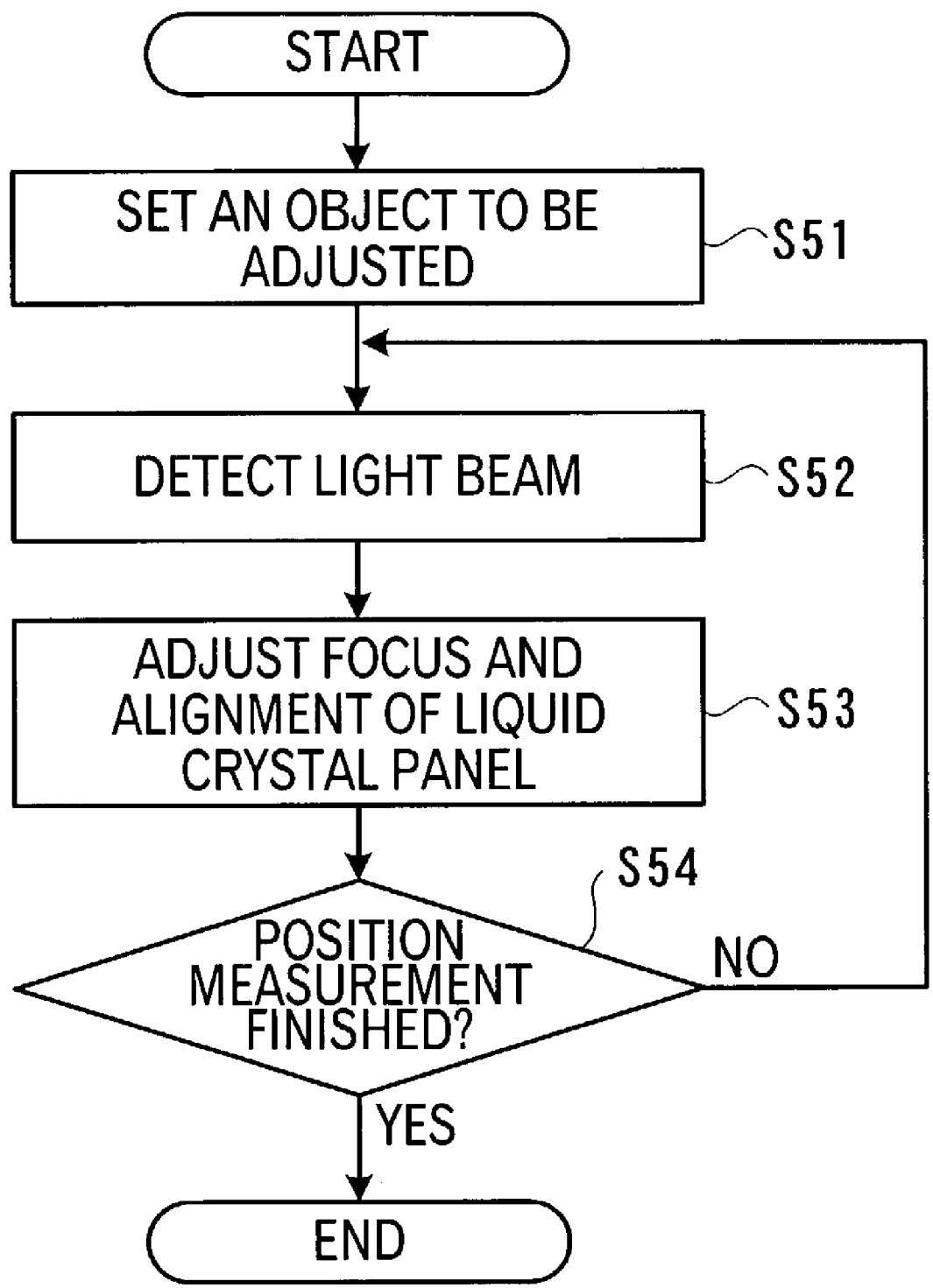
FIG. 26 is a flowchart showing a part of the producing method of the optical device.

(5) The target optical device 180 is set and the position of the respective liquid crystal panels 141R, 141G and 141B are adjusted while detecting the light beam irradiated from the light-irradiating surface 152 of the cross dichroic prism 150 by the CCD cameras 41 (step S5; optical modulator position adjusting step), which is specifically conducted according to the flowchart shown in FIG. 26.

(5-1) After detaching the master 700 and setting the pedestal 10, the prism unit 154 including the cross dichroic prism 150 is set on the pedestal 10. Subsequently, the suction device 244 is actuated to hold the liquid crystal panel 141R, 141G and 141B being in contact with the pad 243 of the liquid crystal panel holder 24 while inserting the pin 145 on which ultraviolet curing adhesive is coated (step S51).

(5-2) The position adjusting light beam is irradiated on, for instance, the liquid crystal panel 141G and the light beam irradiated by the light-irradiating surface 152 (FIG. 3) of the cross dichroic prism 150 is detected by the CCD camera 41 (step S52).

(5-3) While receiving the signal from the CCD camera 41, the computer 70 advances, backward and forward and planar moves the liquid crystal panel 141G relative to the light-incident surface 151 of the cross dichroic prism 150 to adjust focus and alignment of the liquid crystal panel 141G using image processing function thereof (step S53).

(5-4) The adjustment of focus and alignment is repeated until the images displayed on the respective image formation areas 72A to 72D completely coincide with the position of the reference pattern image registered in advance (step S54).

(6) After the focus and alignment of the liquid crystal panel 141G is thus adjusted, the fixing light source body 322 is actuated to irradiate ultraviolet (UV) from the respective light source member 321 to the pin 145 to fix the liquid crystal panel 141G (step S6; optical modulator position-fixing step).

(7) After completion of adjustment of the liquid crystal panel 141G, the same process is conducted on the other liquid crystal panels 141R and 141B. In other words, the above-described steps are continuously conducted for each liquid crystal panel 141R and 141B (step S7). At this time, the reference pattern corresponding to the liquid crystal panels 141R and 141B registered in advance is fetched from the storage.

Incidentally, the ultraviolet (UV) may be collectively irradiated after completion of focus and alignment adjustment of all the liquid crystal panels 141R, 141G and 141B, thereby reducing production time.

Highly accurate optical device 180 is produced as described above.

[8. Advantages]

According to the present embodiment, following advantages can be obtained.

(1) Since there is no need for preparing a master optical device and for preparing a machine dedicated for producing the master optical device, the production cost of the highly accurate optical device 180 can be reduced.

(2) The positioning mater 700 is used and the attitude of the measurement reference surface 511A relative to the CCD camera 41 can be accurately and easily adjusted only by adjusting the attitude of the measurement reference surface 511A of the test sheet 511 by operating the adjusting unit 713. Accordingly, the measurement reference surface 511A can be used as a reference for obtaining the reference position of the CCD camera 41. Further, since a predetermined test pattern is formed on the measurement reference surface 511A, the light beam including the test pattern image introduced from the backside can be accurately detected by the CCD camera 41.

(3) The attitude of the measurement reference surface 511A of the test sheet 511 can be easily adjusted only by introducing the measurement light X from the existing auto-collimator 620 fixed in advance to the measurement reference surface 511A and by detecting the reflection light Y therefrom.

(4) The master body 710 and the pedestal 720 of the positioning master 700 can be easily attached and detached only by operating the clamp 723.

(5) Since the light-emitting diode 311 is used as the adjustment light source 31, the power consumption in producing the optical device 180 can be reduced as compared to the metal halide lamp etc. and the light source 31 can be semi-permanently used. Accordingly, the energy consumption can be reduced, thereby reducing the cost for the adjustment light source 31.

(6) Since ultraviolet is irradiated from one fixing light source body 322 approximately simultaneously on the holes 143A at the four corners of the holding frame 143, the irradiation time of the ultraviolet can be reduced as compared to sequential irradiation on the holes 143A, thus reducing processing cost.

(7) Since the pad 243 in contact with the liquid crystal panel 141R, 141G and 141B is made of porous elastic material, damage on the liquid crystal panels 141R, 141G and 141B can be avoided.

(8) Since the liquid crystal panels 141R, 141G and 141B are held by vacuum suction using the suction device 244, the holding mechanism can be simplified as compared to an arrangement of, for instance, vertically sandwiching the liquid crystal panels 141R, 141G and 141B. Further, deterioration in alignment accuracy on account of distortion of the holding frame 143 (frame portion) of the liquid crystal panels 141R, 141G and 141B can be prevented.

(9) Since the total reflection mirror 413A and the lens 412A are accommodated inside the respective CCD cameras 41 so that the respective light beam sensors 40 can work completely independently, the structure of the light beam sensor 40 can be simplified.

(10) Since the total reflection mirror 413A is disposed in the mirror unit 413 and the lens 412A is disposed in the casing 412, leakage of the introduced light beam toward outside and influence of the outside light on the introduced light beam can be prevented.

(11) Since the light beam sensor 40 is constructed by four CCD cameras 41, the four corners of the liquid crystal panels 141R, 141G and 141B can be independently taken by the respective CCD cameras 41 to be displayed on the respective image formation areas 72A to 72D. Accordingly, the focus and alignment on all the displayed portions can be adjusted while observing the displayed condition on the respective image formation areas 72A to 72D, thereby conducting the adjustment with higher accuracy.

(12) Since the four CCD cameras 41 are located corresponding to the diagonal lines of the rectangular image formation area of the liquid crystal panels 141R, 141G and 141B, interference between the CCD cameras 41 can be prevented and the moving mechanism 43 can be located freely utilizing the space between the CCD cameras 41.

(13) Since the position adjustment is repeated for every liquid crystal panels 141R, 141G and 141B, the CCD camera 41 can be in common used for adjusting the respective liquid crystal panels 141R, 141G and 141B, so that the liquid crystal panels 141R, 141G and 141B can be adjusted with small number (four) of the CCD cameras 41.

(14) Since the optical device 180 is produced according to the above-described producing method, highly accurate optical device 180 can be inexpensively produced. Further, since the highly accurate optical device 180 is installed in the projector 100, the projector 100 capable of projecting vivid projection image can be produced with low cost.

[9. Modifications]

The scope of the present invention is not limited to the above-described embodiment, but other arrangements is possible as long as an object of the present invention can be achieved, which includes following modifications.

In the above embodiment, though the light source unit 30 provided on the optical device producing machine 2 in advance is used in using the positioning master 700 on the producing machine 2, a dedicated light source unit may be provided to the positioning master 700 itself. In such arrangement, the adjustable range of brightness of the light source can be widened.

Though the reference position of the CCD camera 41 is located at the center of the cross dichroic prism 150 in the above embodiment, the reference position may be set at a designed position of the liquid crystal panel 141G. In this case, the positioning master 700 may be disposed so that the measurement reference surface 511A of the test sheet 511 is located at the designed position of the liquid crystal panel 141G. In other words, the reference position of the CCD camera 41 is not restricted as long as the reference position is set based on the designed position of the liquid crystal panel 141G (back focus position of the projection lens).

In the above embodiment, though the test sheet 511 with a predetermined test pattern being formed thereon is used as a member including the measurement reference surface, other members such as glass or resin-made light-transmission plate with a pattern being applied thereon and a predetermined slit may be used.

Though the light-emitting diode 311 is used as the adjustment light source 31 of the light source unit 30 in the above embodiment, self-luminous element such as Organic Electro Luminescence element may be used. Further, discharge type light source such as metal halide lamp may be used. In other words, the type of the light source is not limited.

Though the liquid crystal panels 141R, 141G and 141B are used as the optical modulator for modulating light in accordance with image signal in the above embodiment, the present invention may be applied to a optical modulator other than liquid crystal element such as a device using a micro-mirror and a reflection liquid crystal panel of LCOS (liquid crystal on silicon) type.

Though the optical device 180 is installed in the projector 100, the arrangement is not limited and the optical device 180 may be installed in the other optical device.

Specific structure and shape in implementing the present invention may be designed in any manner as long as an object of the present invention can be achieved.

What is claimed is:

1. A producing method of an optical device, the optical device including a plurality of optical modulators that modulates a plurality of color lights in accordance with image information for each color light, and a color combining optical system having a plurality of light-incident surfaces for the optical modulators to be attached and a light-irradiating surface that combines and irradiates the color light incident on the light-incident surface, the method comprising the steps of:

obtaining average optical characteristics of a projection optical system combined with the optical device;

setting a reference position of a light beam sensor for detecting a light beam irradiated from the light-irradiating surface of the color combining optical system based on a designed position of any one of the optical modulators relative to the color combining optical system;

setting a calibrated position relative to the designed position based on the average optical characteristics of the projection optical system;

moving the light beam sensor to the calibrated position;

mounting an optical device to be adjusted;

adjusting the position of the optical modulator while detecting the light beam irradiated from the light-irradiating surface of the color combining optical system by the light beam sensor; and fixing the position of the optical modulator of which position is adjusted.

2. An optical device produced in accordance with the producing method of an optical device according to claim 1.

3. A projector comprising the optical device according to claim 2.

4. The producing method of an optical device according to claim 1, the reference position being set by disposing a positioning master having a measurement reference surface at the designed position and by detecting the light beam irradiated from the measurement reference surface with the light beam sensor, and prior to setting the reference position, the light beam being introduced on the measurement reference surface to detect a light reflected by the measurement reference surface, thereby adjusting the attitude of the measurement reference surface.

5. An optical device produced in accordance with the producing method of an optical device according to claim 4.

6. A projector comprising the optical device according to claim 5.

7. The producing method of an optical device according to claim 4, wherein the attitude of the reference surface being adjusted by an auto-collimator.

8. An optical device produced in accordance with the producing method of an optical device according to claim 7.

9. A projector comprising the optical device according to claim 8.

10. A positioning master that sets a reference position of a light beam sensor, the light beam sensor used for producing an optical device having a plurality of optical modulators that modulates a plurality of color lights in accordance with image information for each color light, and a color combining optical system having a plurality of light-incident surfaces for the optical modulators to be attached and a light-irradiating surface that combines and irradiates the color light incident on the light-incident surface, the positioning master comprising:

a measurement reference surface that transmits and irradiates the light beam introduced from a backside; and an attitude adjustor that adjusts the attitude of the measurement reference surface relative to the irradiating direction of the light beam.

* * * * *